(12) United States Patent
Lutke et al.

(10) Patent No.: US 8,511,606 B1
(45) Date of Patent: Aug. 20, 2013

(54) UNMANNED AERIAL VEHICLE BASE STATION

(75) Inventors: Kevin Reed Lutke, Huntington Beach, CA (US); Aaron Jonathan Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 799 days.

(21) Appl. No.: 12/634,146

(22) Filed: Dec. 9, 2009

(51) Int. Cl.
*B64D 41/00* (2006.01)

(52) U.S. Cl.
USPC .................. 244/58; 244/100 R; 320/109

(58) Field of Classification Search
USPC ........... 244/58, 100 R, 110 R, 110 G, 117 R, 244/1 R, 190, 12.3, 53 R, 172.2, 172.9; 320/109, 108; 701/3, 13; 414/227; 191/10
See application file for complete search history.

(56) References Cited

U.S. PATENT DOCUMENTS

| | | | |
|---|---|---|---|
| 7,318,564 B1 | | 1/2008 | Marshall |
| 7,398,946 B1 | * | 7/2008 | Marshall .................. 244/58 |
| 2005/0231157 A1 | * | 10/2005 | Sanders et al. ............... 320/109 |
| 2011/0049992 A1 | * | 3/2011 | Sant'Anselmo et al. ....... 307/64 |
| 2012/0112691 A1 | * | 5/2012 | Kurs et al. .................... 320/108 |
| 2012/0126745 A1 | * | 5/2012 | Partovi et al. ................ 320/108 |

OTHER PUBLICATIONS

Grant, "The Radar Game, Understanding Stealth and Aircraft Survivability", 1998, IRIS Independent Research, pp. 1-51.
U.S. Appl. No. 12/120,065, filed May 13, 2008, Lutke et al.

* cited by examiner

*Primary Examiner* — Christopher P Ellis
*Assistant Examiner* — Medhat Badawi
(74) *Attorney, Agent, or Firm* — Yee & Associates, P.C.

(57) ABSTRACT

A method and apparatus comprising a platform, a battery system, a power generation system, a number of charging stations, and a controller. The platform is configured to house a number of unmanned aerial vehicles. The power generation system is connected to the battery system. The power generation system is configured to generate electrical energy from an environment in which the platform is located, and store the electrical energy in the battery system. The number of charging stations is connected to the battery system. The controller is connected to the battery system and is configured to receive sensor data from the number of unmanned aerial vehicles, generate information from the sensor data, and send the information to a remote location.

19 Claims, 16 Drawing Sheets

UNMANNED AERIAL VEHICLE BASE STATION

BACKGROUND INFORMATION

1. Field:

The present disclosure relates generally to aircraft and, in particular, to unmanned aerial vehicles. Still more particularly, the present disclosure relates to a method and apparatus for operating unmanned aerial vehicles in different locations.

2. Background:

An unmanned aerial vehicle (UAV) is an aircraft that flies without human operators being present in the aircraft. Unmanned aerial vehicles may be controlled from a remote location. At this remote location, a human operator or a program executed by a computer generates commands for the unmanned aerial vehicle. Unmanned aerial vehicles also may be controlled using a program running on a computer or other controller on the unmanned aerial vehicle.

Unmanned aerial vehicles are used for a number of different purposes. Currently, the largest use is for military applications. Unmanned aerial vehicles may be used to perform missions that may include, for example, without limitation, reconnaissance missions, attack missions, and/or other suitable types of missions. Unmanned aerial vehicles also may be used in a number of civilian applications. For example, without limitation, unmanned aerial vehicles may be used to perform surveying, firefighting, and/or other suitable types of missions.

Unmanned aerial vehicles may come in a number of different sizes and shapes. Unmanned aerial vehicles may, for example, take the form of fixed wing aircraft, helicopters, and/or ornithopters. For example, without limitation, an unmanned aerial vehicle may take the form of an airplane, a helicopter, or some other suitable type of device capable of flying. The size of an unmanned aerial vehicle may vary greatly. For example, an unmanned aerial vehicle may have a wing span from about a few inches to about 200 feet, depending on the type of unmanned aerial vehicle.

Smaller unmanned aerial vehicles are referred to as micro air vehicles. These types of air vehicles may be configured to be carried by a person and may be launched by the person. For example, the micro air vehicles may be launched by the person throwing the micro air vehicles in the air. The small size of these types of air vehicles allows this type of launching method to provide sufficient velocity for these air vehicles to begin flight.

The size of unmanned aerial vehicles has been reduced in part because of a reduction in the sizes of sensors, motors, power supplies, and controllers for these types of vehicles.

These reduced sizes and reductions in cost make it desirable to operate these vehicles in large numbers. For example, micro air vehicles (MAVs) may be operated in numbers that are about the size of a squad or platoon, as compared to operating one or two larger unmanned aerial vehicles. This type of operation increases the monitoring that can be performed for a particular area.

These types of unmanned aerial vehicles also may land on a perch, a building, or another location. In this manner, a micro air vehicle may monitor a particular location without having to continue flight. The micro air vehicle may be repositioned if the area of interest changes.

For example, a micro air vehicle may land on a building in a city or town. The micro air vehicle may monitor a particular road or building in the city.

Micro air vehicles, however, have limitations with their smaller size, as compared to larger unmanned aerial vehicles. For example, the processing power and data transmission ranges may be more limited for micro air vehicles, as compared to larger unmanned aerial vehicles. Further, the range of these micro air vehicles may be shorter, as compared to the larger unmanned aerial vehicles.

Therefore, it would be advantageous to have a method and apparatus that takes into account one or more of the issues discussed above, as well as other possible issues.

SUMMARY

In one advantageous embodiment, an apparatus comprises a platform, a battery system, a power generation system, a number of charging stations, and a controller. The platform is configured to house a number of unmanned aerial vehicles. The power generation system is connected to the battery system. The power generation system is configured to generate electrical energy from an environment in which the platform is located, and store the electrical energy in the battery system. The number of charging stations is connected to the battery system. The controller is connected to the battery system and configured to receive sensor data from the number of unmanned aerial vehicles, generate information from the sensor data, and send the information to a remote location.

In another advantageous embodiment, an apparatus comprises a platform, a number of charging stations, and a controller. The platform is configured to house a number of unmanned aerial vehicles. Each charging station in the number of charging stations is configured to charge the number of unmanned aerial vehicles. The controller is configured to receive sensor data from the number of unmanned aerial vehicles.

In yet another advantageous embodiment, a method is present for operating an unmanned aerial vehicle. The unmanned aerial vehicle is charged at a charging station for an unmanned aerial vehicle base station. The unmanned aerial vehicle base station comprises a platform configured to house a number of unmanned aerial vehicles, a battery system connected to the charging station, a power generation system connected to the battery system, and a controller connected to the battery system. The power generation system is configured to generate electrical energy from an environment in which the platform is located. The power generation system is configured to store the electrical energy in the battery system. The controller is connected to the battery system and is configured to receive sensor data from the number of unmanned aerial vehicles, generate information from the sensor data, and send the information to a remote location. The unmanned aerial vehicle is flown to a location after charging the unmanned aerial vehicle. The sensor data is sent to the controller.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of considerations. For example, the different advantageous embodiments recognize and take into account that unmanned aerial vehicles may be more susceptible to environmental conditions as the size of the unmanned aerial vehicles decreases. For example, a micro air vehicle having a wing span of about 13 inches and a weight of about six ounces may be more susceptible to wind gusts, rain, hail, and/or other conditions, as compared to an unmanned aerial vehicle having a wing span of about 84 feet and a weight of about 7,000 pounds.

The different advantageous embodiments also recognize and take into account that having human operators launch, retrieve, and/or maintain unmanned aerial vehicles during a mission may be time-consuming and/or expensive. The different advantageous embodiments also recognize and take into account that with the use of human operators, the mission being performed by the unmanned aerial vehicles may be more likely detected when such detection is undesirable.

Further, as the size of an unmanned aerial vehicle decreases, the range and complexity of the components in the unmanned aerial vehicle also may decrease. As a result, more maintenance of these types of unmanned aerial vehicles may be required.

Thus, the different advantageous embodiments provide a method and apparatus for performing a mission using unmanned aerial vehicles. In one advantageous embodiment, an apparatus comprises a platform, a battery system, a power generation system, a number of charging stations, and a controller. The platform is configured to house a number of unmanned aerial vehicles. The battery system is configured to store electrical energy in the form of chemical energy.

The battery system is configured to generate electrical current as needed to provide power to the various components in the apparatus. The power generation system is connected to the battery system. The power generation system is configured to generate electrical energy from an environment in which the platform is located. The power generation system is also configured to store the electrical energy in the battery system. The number of charging stations is connected to the battery system in which each charging station in the number of charging stations is configured to charge an unmanned aerial vehicle. The controller is configured to receive sensor data from a number of unmanned aerial vehicles and generate information from the data and send the information to a remote location.

Figure 1:
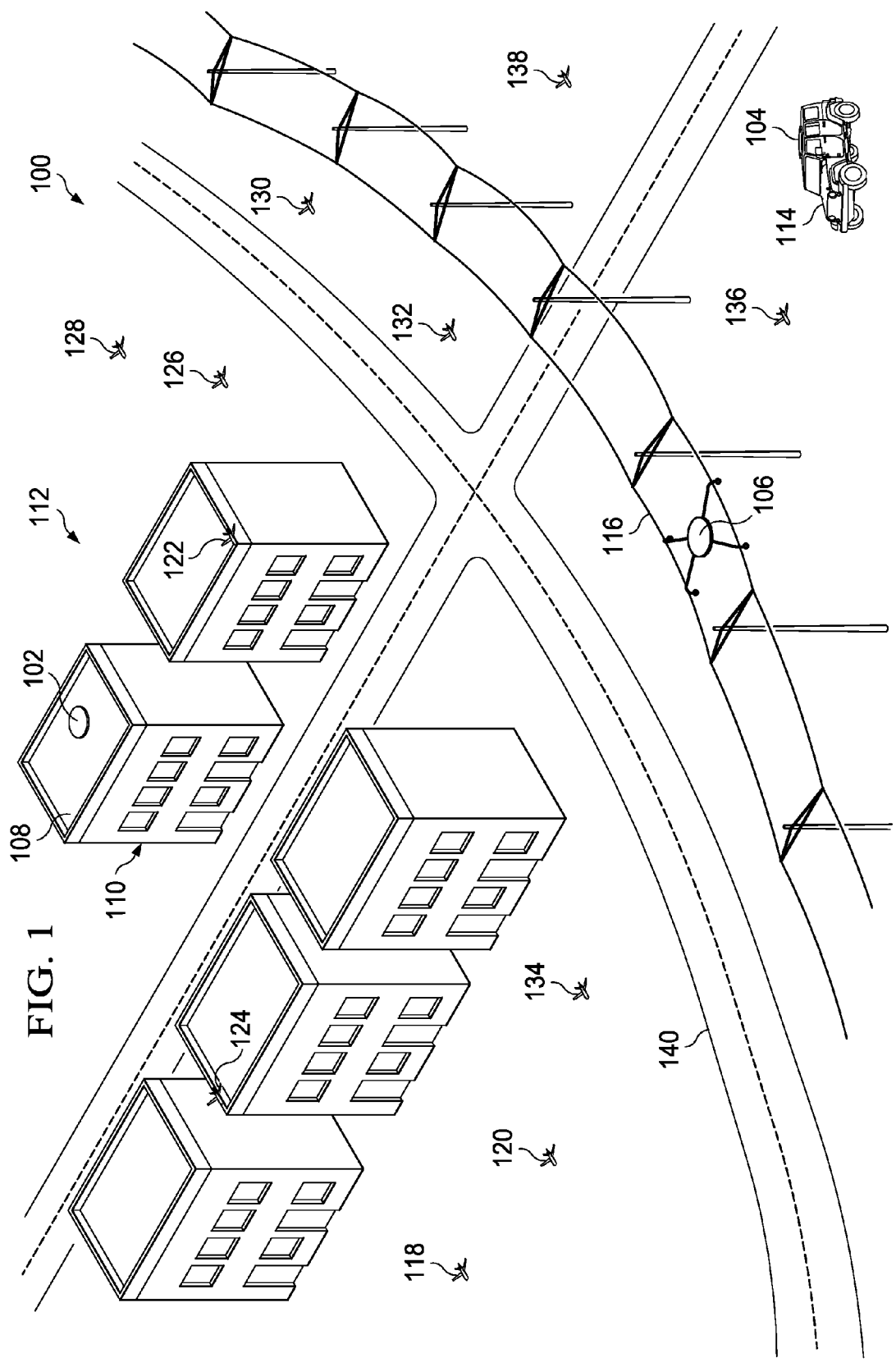
FIG. 1 is an illustration of an unmanned aerial vehicle environment in accordance with an advantageous embodiment.

With reference now to FIG. 1, an illustration of an unmanned aerial vehicle environment is depicted in accordance with an advantageous embodiment. Unmanned aerial vehicle environment 100 includes unmanned aerial vehicle base station 102, unmanned aerial vehicle base station 104, and unmanned aerial vehicle base station 106.

In this illustrative example, unmanned aerial vehicle base station 102 is located on rooftop 108 of building 110 within town 112. Unmanned aerial vehicle base station 104 is associated with vehicle 114. A first component may be considered to be associated with a second component by being secured to the second component, bonded to the second component, fastened to the second component, and/or connected to the second component in some other suitable manner. The first component also may be connected to the second component by a third component. The first component may be considered to be associated with the second component by being formed as part of and/or an extension of the second component.

Unmanned aerial vehicle base station 106 is located on power lines 116. Unmanned aerial vehicle base stations 102, 104, and 106 may be deployed in a number of different ways. Unmanned aerial vehicle base station 102 may be dropped off by helicopter on rooftop 108. The location of unmanned aerial vehicle base station 102 on rooftop 108 may result in unmanned aerial vehicle base station 102 being less observable. Further, this location may provide a better line of sight between unmanned aerial vehicle base station 102 and communication arrays. In this manner, the range at which unmanned aerial vehicle base station 102 may communicate with unmanned aerial vehicles may be increased.

Unmanned aerial vehicle base station 104 is associated with vehicle 114. By being associated with vehicle 114, unmanned aerial vehicle base station 104 may be moved periodically or constantly. This type of deployment may reduce the discoverability of unmanned aerial vehicle base station 104. Further, by providing mobility to unmanned aerial vehicle base station 104, greater flexibility may be present for performing missions. In addition, unmanned aerial vehicle base station 104 may be removed from vehicle 114 and placed on the ground or in some other suitable location.

Unmanned aerial vehicle base station 106 may be deployed onto power lines 116 by being dropped by a helicopter, on a parachute, or some other suitable mechanism. Unmanned aerial vehicle base station 106 may be less observable on power lines 116. As depicted, unmanned aerial vehicles, such as unmanned aerial vehicles 118, 120, 122, 124, 126, 128, 130, 132, 134, 136, and 138 may operate from unmanned aerial vehicle base stations 102, 104, and 106.

In these illustrative examples, unmanned aerial vehicle base stations 102, 104, and 106 provide a base from which the different unmanned aerial vehicles may transmit data, receive instructions, recharge, be stored, and/or perform other operations.

Additionally, unmanned aerial vehicles may travel from base station to base station. In other words, unmanned aerial vehicle base stations 102, 104, and 106 may provide a network to extend the range of unmanned aerial vehicles. Having multiple unmanned aerial vehicle base stations also may provide backup in case one unmanned aerial vehicle base station malfunctions or fails to perform as needed.

As can be seen in this depicted example, unmanned aerial vehicle base stations 102, 104, and 106 may be placed in locations where detection of those base stations may be reduced. These locations may include other locations other than those illustrated in this particular example. For example, unmanned aerial vehicle base stations 102, 104, and 106 may be placed in trees, in brush, and/or in other suitable locations.

The unmanned aerial vehicles may be used to perform a number of different missions in unmanned aerial vehicle environment 100. In this illustrative example, the unmanned aerial vehicles may monitor for undesired activity. For example, the undesired activity may be the placement of an improvised explosive device in roadway 140. In another illustrative example, the unmanned aerial vehicles may monitor for movement of vehicles or people. In still other examples, unmanned aerial vehicles may be used to monitor for construction of structures.

Figure 2:
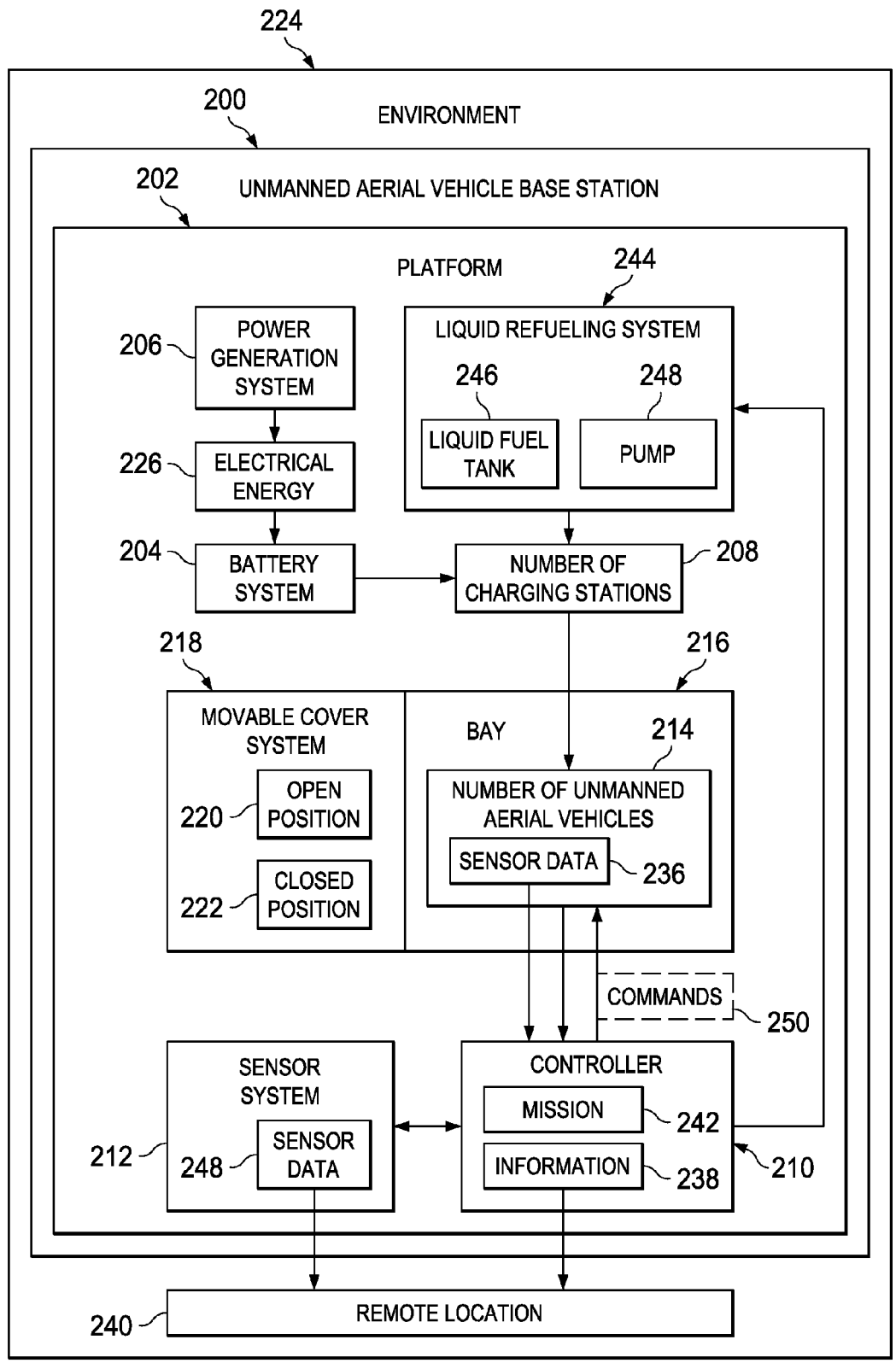
FIG. 2 is an illustration of a block diagram of an unmanned aerial vehicle base station in accordance with an advantageous embodiment.

With reference now to FIG. 2, an illustration of a block diagram of an unmanned aerial vehicle base station is depicted in accordance with an advantageous embodiment. Unmanned aerial vehicle base station 200 is an example of an unmanned aerial vehicle base station that may be used to implement unmanned aerial vehicle base stations 102, 104, and 106 in FIG. 1.

In this illustrative example, unmanned aerial vehicle base station 200 comprises platform 202, battery system 204, power generation system 206, number of charging stations 208, controller 210, sensor system 212, and/or other suitable components.

Platform 202 is configured to house number of unmanned aerial vehicles 214. In other words, number of unmanned aerial vehicles 214 may be placed in and/or stored in or on platform 202. For example, platform 202 may have bay 216 in which number of unmanned aerial vehicles 214 may land. Bay 216 may be an area of platform 202 surrounded by walls with an opening on the top side of platform 202. In other advantageous embodiments, bay 216 may have walls and a roof with an opening on the side of platform 202. An unmanned aerial vehicle is considered to be housed when the unmanned aerial vehicle enters into or lands on platform 202.

Additionally, platform 202 may be configured to provide protection from environment 224 for number of unmanned aerial vehicles 214 when number of unmanned aerial vehicles 214 is housed in platform 202.

Platform 202 also may have movable cover system 218 that is configured to move between open position 220 and closed position 222. Movable cover system 218 may cover bay 216. When movable cover system 218 is in open position 220, number of unmanned aerial vehicles 214 may take off from and/or land in or on platform 202.

When movable cover system 218 is in closed position 222, number of unmanned aerial vehicles 214 located in bay 216 of platform 202 may be protected from environment 224. Further, closed position 222 also provides a configuration for transporting number of unmanned aerial vehicles 214 in unmanned aerial vehicle base station 200.

Battery system 204 and power generation system 206 provide electrical energy 226 for unmanned aerial vehicle base station 200 and number of unmanned aerial vehicles 214. Battery system 204 stores electrical energy 226 generated by power generation system 206. Power generation system 206 generates electrical energy 226 from environment 224 in which unmanned aerial vehicle base station 200 is located.

Number of charging stations 208 is connected to battery system 204. Number of charging stations 208 is configured to charge number of unmanned aerial vehicles 214 using electrical energy 226. Further, number of charging stations 208 provides electrical energy 226 to controller 210 and sensor system 212 in unmanned aerial vehicle base station 200.

In some advantageous embodiments, number of unmanned aerial vehicles 214 may take the form of liquid fueled unmanned aerial vehicles. In these illustrative examples, number of charging stations 208 is configured to refuel these liquid fueled unmanned aerial vehicles. For example, unmanned aerial vehicle base station 200 may have liquid refueling system 244. Liquid refueling system 244 has liquid fuel tank 246 containing liquid fuel. The liquid fuel may be, for example, gasoline or diesel fuel. Pump 248 in liquid refueling system 244 transfers the liquid fuel in liquid fuel tank 246 to number of charging stations 208. Number of charging stations 208 is configured to provide liquid fuel to the liquid fuel unmanned aerial vehicles.

In these illustrative examples, controller 210 may be configured to control the pumping of liquid fuel from liquid refueling system 244. In some advantageous embodiments, liquid refueling system 244 may deliver liquid fuel to number of unmanned aerial vehicles 214 at number of charging stations 208 using a syringe injection system.

In these illustrative examples, controller 210 is configured to receive sensor data 236 from number of unmanned aerial vehicles 214. Additionally, controller 210 is configured to generate information 238 from sensor data 236. Information 238 may then be sent to remote location 240. Remote location 240 is a location remote to unmanned aerial vehicle base station 200. Controller 210 is also configured to program each of number of unmanned aerial vehicles 214 with mission 242. Mission 242 may be the same or different for each of number of unmanned aerial vehicles 214.

Sensor system 212 generates sensor data 248 from environment 224. Sensor data 248 may be sent to remote location 240 or may be used to send commands 250 to number of unmanned aerial vehicles 214 or to program number of unmanned aerial vehicles 214 with mission 242.

The illustration of unmanned aerial vehicle base station 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, different forms of energy may be stored in storage devices for conversion into electrical energy for number of unmanned aerial vehicles 214. These storage devices may be devices other than battery system 204. These devices may include, for example, without limitation, capacitors, flywheels, compressed air devices, and/or other suitable energy storage devices. One or more of these devices may be connected to number of charging stations 208.

Figure 3:
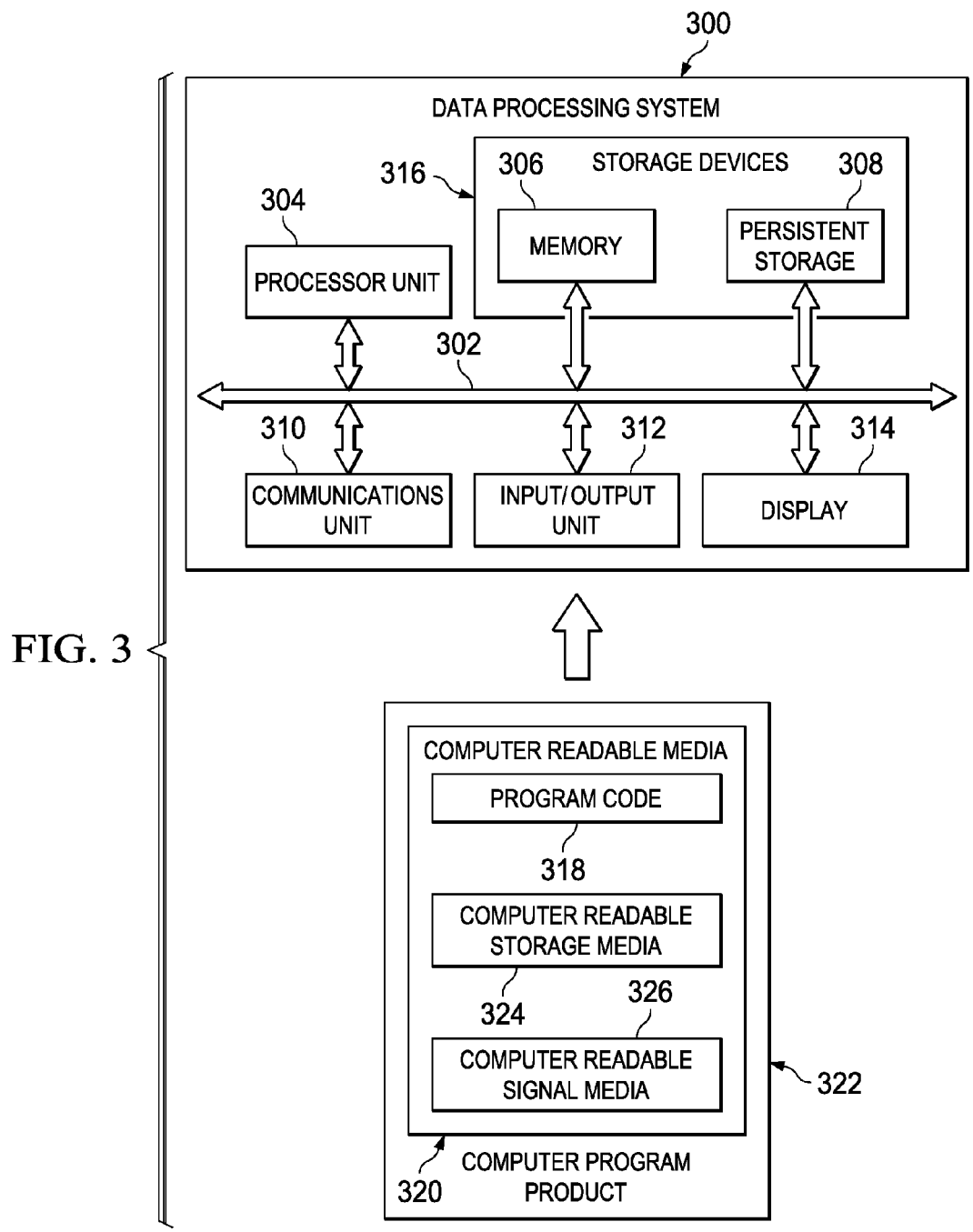
FIG. 3 is an illustration of a block diagram of a data processing system in accordance with an advantageous embodiment.

Turning now to FIG. 3, an illustration of a block diagram of a data processing system is depicted in accordance with an advantageous embodiment. Data processing system 300 is an example of an implementation for controller 210 in FIG. 2. In this illustrative example, data processing system 300 includes communications fabric 302, which provides communications between processor unit 304, memory 306, persistent storage 308, communications unit 310, and input/output (I/O) unit 312.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Memory 306, in these examples, may be, for example, a random access memory or any other suitable volatile or non-volatile storage device.

Persistent storage 308 may take various forms, depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 may be removable. For example, a removable hard drive may be used for persistent storage 308.

Communications unit 310, in these examples, provides for communication with other data processing systems or devices. In these examples, communications unit 310 is a network interface card. Communications unit 310 may provide communications through the use of either or both physical and wireless communications links.

Communications unit 310 is configured to provide wireless communications links. These wireless communications links may include, for example, without limitation, a satellite communications link, a microwave frequency communications link, a radio frequency communications link, and/or other suitable types of wireless communication links.

Input/output unit 312 allows for the input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code, in the different embodiments, may be embodied on different physical or computer readable storage media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322. In one example, computer readable media 320 may be computer readable storage media 324 or computer readable signal media 326.

Computer readable storage media 324 may include, for example, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or flash memory that is connected to data processing system 300. In some instances, computer readable storage media 324 may not be removable from data processing system 300.

Alternatively, program code 318 may be transferred to data processing system 300 using computer readable signal media 326. Computer readable signal media 326 may be, for example, a propagated data signal containing program code 318. For example, computer readable signal media 326 may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 318 may be downloaded over a network to persistent storage 308 from another device or data processing system through computer readable signal media 326 for use within data processing system 300. For instance, program code stored in a computer readable storage media in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system, including components in addition to or in place of those illustrated for data processing system 300. Other components shown in FIG. 3 can be varied from the illustrative examples shown. The different embodiments may be implemented using any hardware device or system capable of executing program code. As one example, data processing system 300 may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Figure 4:
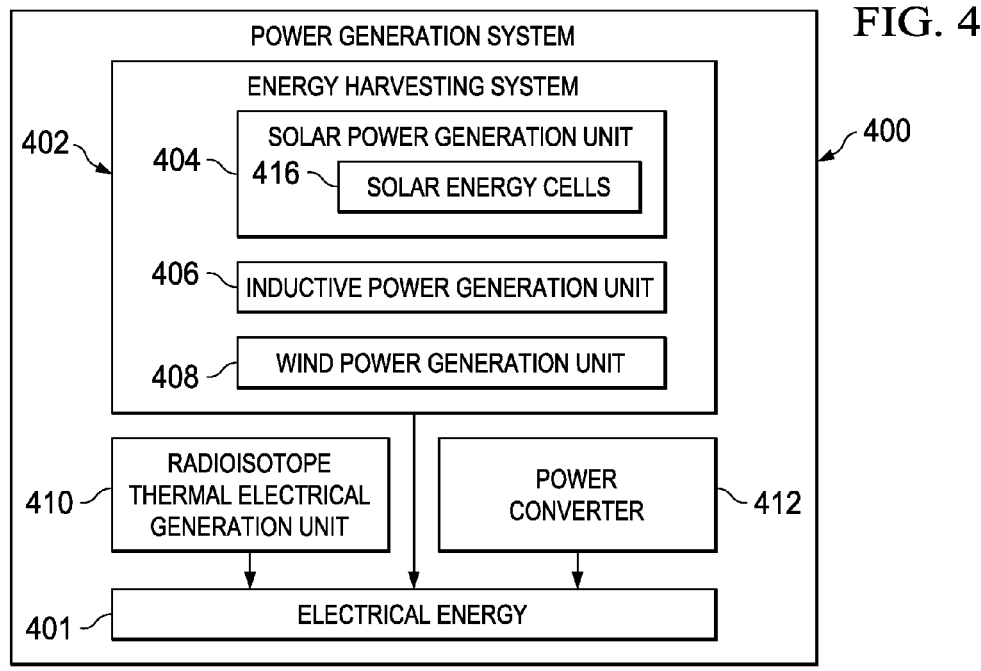
FIG. 4 is an illustration of a block diagram of a power generation system in accordance with an advantageous embodiment.

With reference now to FIG. 4, an illustration of a block diagram of a power generation system is depicted in accordance with an advantageous embodiment. Power generation system 400 is an example of one implementation for power generation system 206 in FIG. 2. Power generation system 400 generates electrical energy 401 in these illustrative examples.

Power generation system 400 may include energy harvesting system 402. Energy harvesting system 402 may comprise at least one of solar power generation unit 404, inductive power generation unit 406, wind power generation unit 408, and/or other suitable types of energy harvesting units. Power generation system 400 also may include radioisotope thermal electrical generation unit 410, power converter 412, and/or other suitable types of power generation devices.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Solar power generation unit 404 generates electrical energy 401 from exposure to sunlight or other light in the environment. Solar power generation unit 404 may comprise solar energy cells 416. In the different illustrative examples, solar energy cells 416 may take the form of photovoltaic units.

Solar energy cells 416 may be located on, for example, without limitation, movable cover system 218 in FIG. 2.

Inductive power generation unit 406 generates power inductively when an alternating current source is present, such as in power lines. This power may be used to provide electrical energy 401. Wind power generation unit 408 may include a number of wind power turbines that generate electrical energy 401 from wind that may be present in the environment.

Radioisotope thermal electrical generation unit 410 generates electrical energy 401 from radioactive material that decays. The decay of the radioactive material generates heat used by radioisotope thermal electrical generation unit 410 to generate electrical energy 401. This radioactive material is carried by the unmanned aerial vehicle base station in these examples.

Power converter 412 converts electrical power from one form to another form. For example, power converter 412 may convert alternating current (AC) energy into direct current (DC) energy. Power converter 412 also may change the frequency of alternating current energy as another example. In yet another example, power converter 412 may change the current flow. Power converter 412 may be used when a power source, such as an electrical outlet, is present. In these illustrative examples, power converter 412 converts energy into electrical energy 401 for use by an unmanned aerial vehicle.

Figure 5:
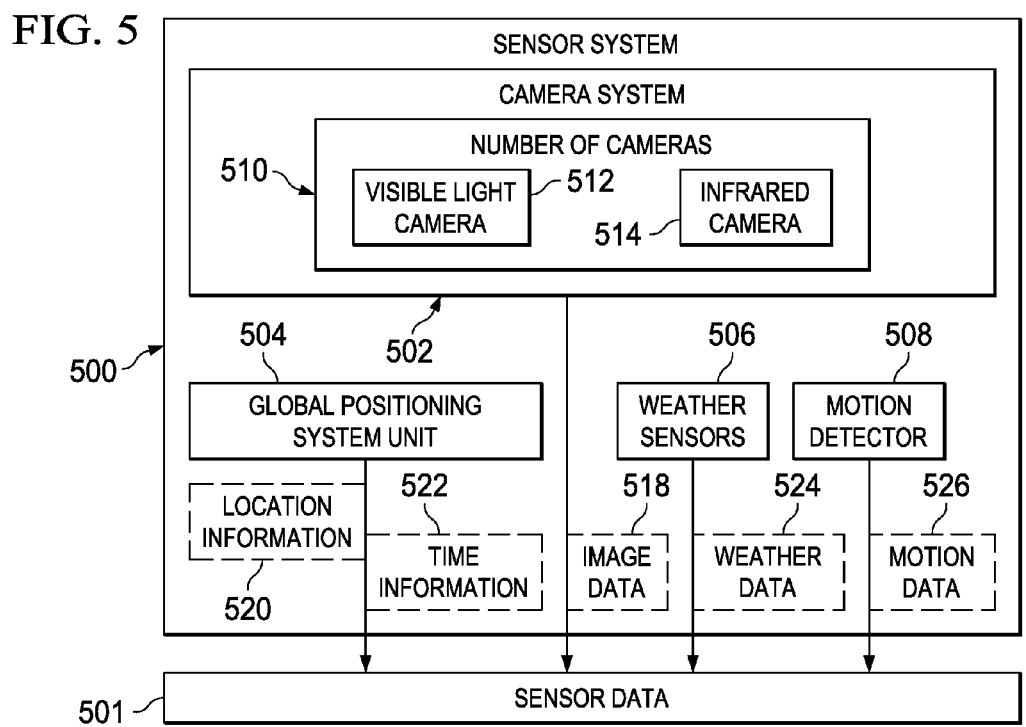
FIG. 5 is an illustration of a block diagram of a sensor system in accordance with an advantageous embodiment.

Turning now to FIG. 5, an illustration of a block diagram of a sensor system is depicted in accordance with an advantageous embodiment. Sensor system 500 is an example of one implementation for sensor system 212 in FIG. 2. In these illustrative examples, sensor system 500 generates sensor data 501. Sensor system 500, in this example, includes camera system 502, global positioning system unit 504, weather sensors 506, and motion detector 508.

Camera system 502 may comprise number of cameras 510. Number of cameras 510 may include at least one of visible light camera 512, infrared camera 514, and other suitable types of cameras. In some advantageous embodiments, visible light camera 512 and infrared camera 514 are combined as part of a multispectral camera.

Camera system 502 generates sensor data 501 in the form of image data 518. Global positioning system unit 504 generates location information 520 in sensor data 501. Location information 520 may include, for example, latitude, longitude, and an elevation. Additionally, time information 522 also may be generated by global positioning system unit 504.

Weather sensors 506 generate weather data 524 in sensor data 501 that may be used to identify weather conditions. For example, weather sensors 506 may generate information about wind speed, pressure, wind direction, humidity, temperature, and/or other suitable information.

Motion detector 508 generates motion data 526 in sensor data 501. Motion detector 508 generates motion data 526 when motion in an area monitored by motion detector 508 is detected.

Figure 6:
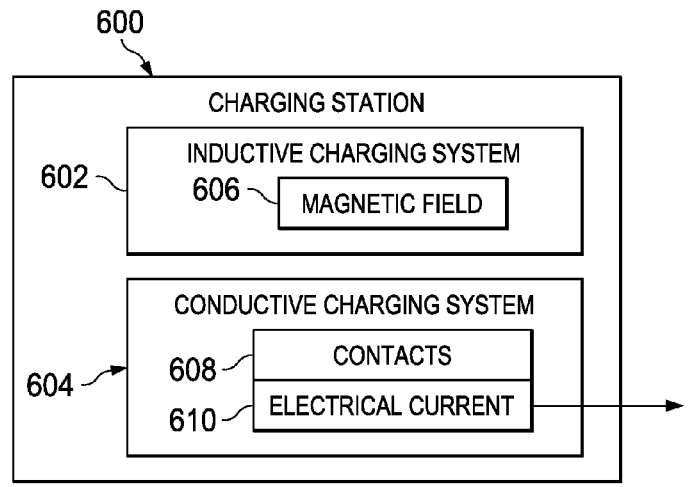
FIG. 6 is an illustration of a block diagram of a charging station in accordance with an advantageous embodiment.

Turning now to FIG. 6, an illustration of a block diagram of a charging station is depicted in accordance with an advantageous embodiment. Charging station 600 is an example of an implementation for a charging station within number of charging stations 208 in FIG. 2.

Charging station 600 may comprise at least one of inductive charging system 602 and conductive charging system 604. Inductive charging system 602 generates magnetic field 606. Magnetic field 606 may induce another magnetic field in a coil located within the device being charged. In this manner, the current may be caused to flow in the device being charged without contact between inductive charging system 602 and the device.

Conductive charging system 604 includes contacts 608. Contacts 608 may be placed in physical contact with contacts on the device being charged. This contact allows for electrical current 610 to flow from conductive charging system 604 to the device being charged by charging station 600. In this manner, the device may be charged and/or recharged to perform additional operations or missions.

Figure 7:
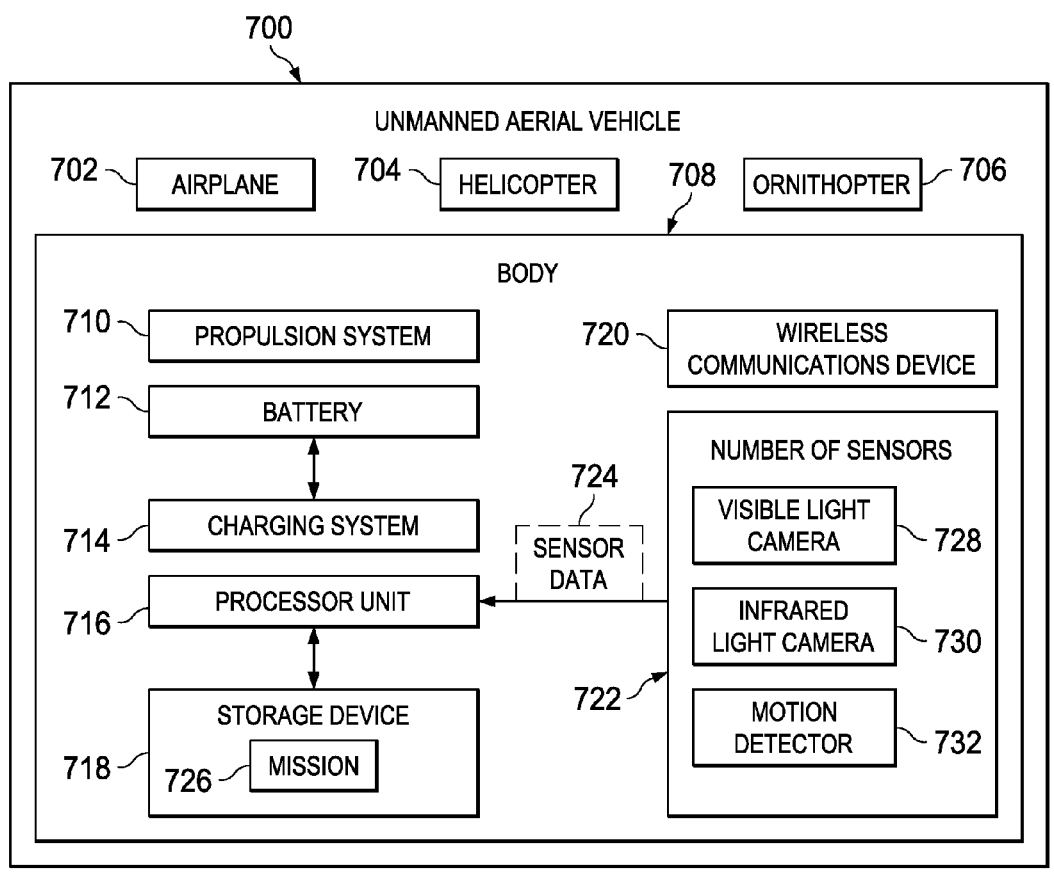
FIG. 7 is an illustration of a block diagram of an unmanned aerial vehicle in accordance with an advantageous embodiment.

Turing now to FIG. 7, an illustration of a block diagram of an unmanned aerial vehicle is depicted in accordance with an advantageous embodiment. Unmanned aerial vehicle 700 is an example of one implementation for number of unmanned aerial vehicles 214 in FIG. 2.

In this illustrative example, unmanned aerial vehicle 700 may take a number of forms. For example, unmanned aerial vehicle 700 may be, for example, without limitation, airplane 702, helicopter 704, ornithopter 706, or some other suitable type of aircraft.

As illustrated, unmanned aerial vehicle 700 comprises body 708, propulsion system 710, battery 712, charging system 714, processor unit 716, storage device 718, wireless communications device 720, and number of sensors 722. Body 708 provides a structure in which the different components of unmanned aerial vehicle 700 may be associated with each other. For example, without limitation, body 708 may be a fuselage. Further, body 708 may include aerodynamic surfaces, such as wings or other types of surfaces.

Propulsion system 710 is configured to move unmanned aerial vehicle 700 in the air. Propulsion system 710 may be, for example, without limitation, an electric motor configured to rotate a propeller or other type of blade. In other advantageous embodiments, propulsion system 710 may be configured to move wings on body 708 when unmanned aerial vehicle 700 takes the form of ornithopter 706. Battery 712 provides electrical energy for unmanned aerial vehicle 700.

Charging system 714 is connected to battery 712 and allows battery 712 to be recharged at a charging station. Charging system 714 may include inductive coils for an inductive charging system or conductive contacts for a conductive charging system. In some advantageous embodiments, charging system 714 also may be used to transfer data. As one illustrative example, charging system 714 may provide a modulated charge as a carrier frequency. This modulated charge allows for the transfer of data in addition to the providing of power.

As another illustrative example, conductive contacts in charging system 714 may be used to transfer data. In other advantageous embodiments, power may be provided wirelessly by charging system 714 using microwaves or a laser.

Processor unit 716 runs a number of programs for missions in these illustrative examples. Storage device 718 may store sensor data 724 generated by number of sensors 722. Additionally, storage device 718 may store mission 726 that is executed or run by processor unit 716. Mission 726 may be, for example, without limitation, a program, an identification of a target, and/or other suitable types of information.

Wireless communication device 720 is configured to provide communications between unmanned aerial vehicle 700 and a remote location, such as unmanned aerial vehicle base station 200 or remote location 240 in FIG. 2. In these illustrative examples, number of sensors 722 may include, for example, at least one of visible light camera 728, infrared light camera 730, motion detector 732, and/or other suitable types of sensors used to generate sensor data 724 for processing by processor unit 716.

The illustration of unmanned aerial vehicle base station 200 and its components in FIGS. 2-6 and unmanned aerial vehicle 700 in FIG. 7 are not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, unmanned aerial vehicle base station 200 may not include movable cover system 218. Instead, bay 216 may be configured to provide protection from environment 224 without moving parts. For example, bay 216 may be a cavity in platform 202 with an opening configured to protect number of unmanned aerial vehicles 214 from environment 224. Additionally, in some advantageous embodiments, unmanned aerial vehicle 700 may not have wireless communications device 720. Instead, a wired contact may be used to transfer data from unmanned aerial vehicle 700 to unmanned aerial vehicle base station 200 when unmanned aerial vehicle 700 lands on platform 202.

Figure 8:
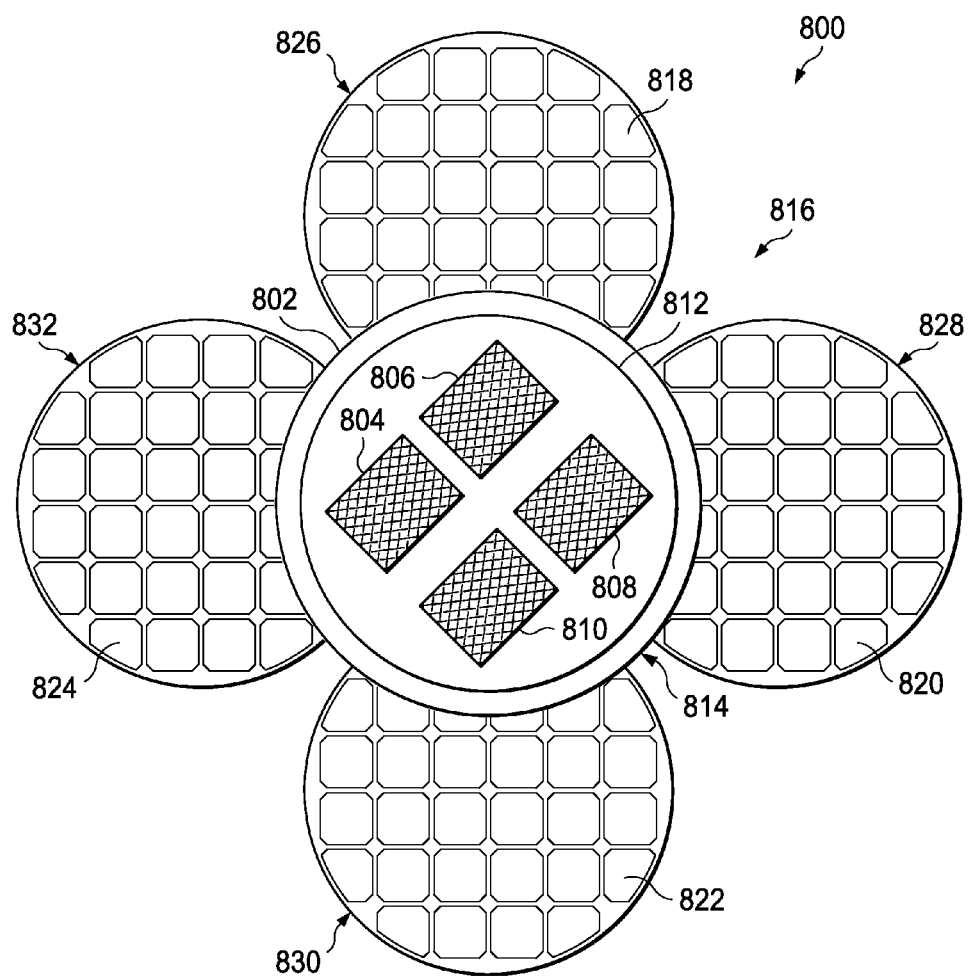
FIG. 8 is an illustration of an unmanned aerial vehicle base station in accordance with an advantageous embodiment.

With reference now to FIG. 8, an illustration of an unmanned aerial vehicle base station is depicted in accordance with an advantageous embodiment. In this illustrative example, unmanned aerial vehicle base station 800 is an example of one implementation for unmanned aerial vehicle base station 200 in FIG. 2. A top view of unmanned aerial vehicle base station 800 is depicted in this figure.

In this depicted example, unmanned aerial vehicle base station 800 has platform 802. In this illustrative example, platform 802 has a circular shape. In other advantageous embodiments, platform 802 may have some other suitable shape. Charging stations 804, 806, 808, and 810 are located in bay 812 in platform 802. Charging stations 804, 806, 808, and 810 take the form of inductive charging stations in this illustrative example. Platform 802 is also associated with antenna 814. Antenna 814 transmits information over a wireless communications link.

As depicted, unmanned aerial vehicle base station 800 has movable cover system 816. Movable cover system 816 comprises panels 818, 820, 822, and 824. In this illustrative example, movable cover system 816 is in an open configuration.

As depicted, photovoltaic arrays 826, 828, 830, and 832 are present on panels 818, 820, 822, and 824, respectively. These arrays form part of a power generation system for unmanned aerial vehicle base station 800.

Figure 9:
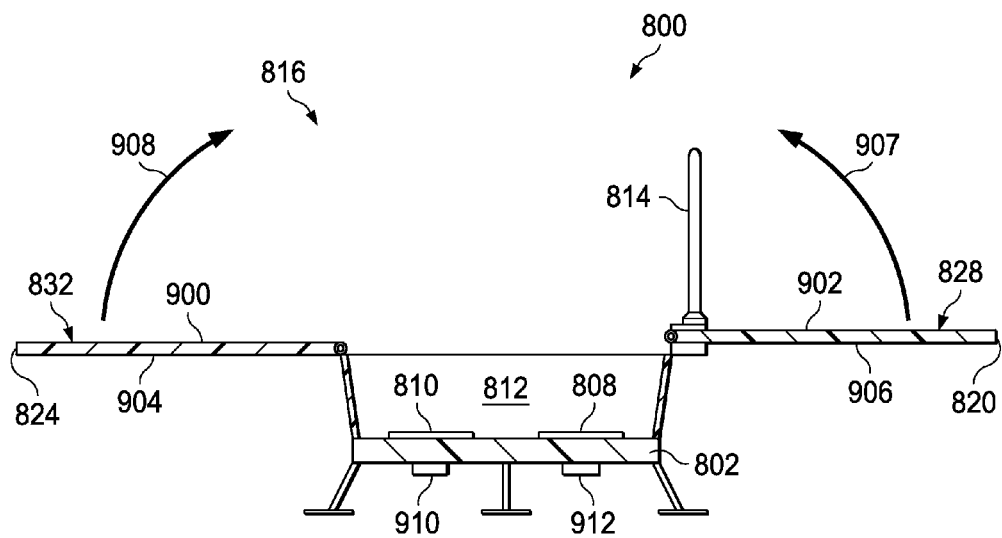
FIG. 9 is a cross-sectional side view of an unmanned aerial vehicle base station in accordance with an advantageous embodiment.

With reference now to FIG. 9, a cross-sectional side view of an unmanned aerial vehicle base station is depicted in accordance with an advantageous embodiment. In this illustrative example, a cross-sectional side view of unmanned aerial vehicle base station 800 is depicted. As illustrated, unmanned aerial vehicle base station 800 is shown in an open configuration.

As seen in this view, photovoltaic array 832 is on top side 900 of panel 824. Photovoltaic array 828 is on top side 902 of panel 820.

Side 904 of panel 824 and side 906 of panel 820 provide a protective shell for bay 812 when these panels are in a closed configuration. In this illustrative example, panel 820 may move in the direction of arrow 907, and panel 824 may move in the direction of arrow 908 to cover bay 812 when these panels are moved into the closed configuration. The movement of these panels and the other panels (not shown) may be performed using a number of actuators, a gear system, or some other suitable device.

In this illustrative example, battery 910 and controller 912 are located within platform 802. In these examples, battery 910 and controller 912 are located under bay 812.

Figure 10:
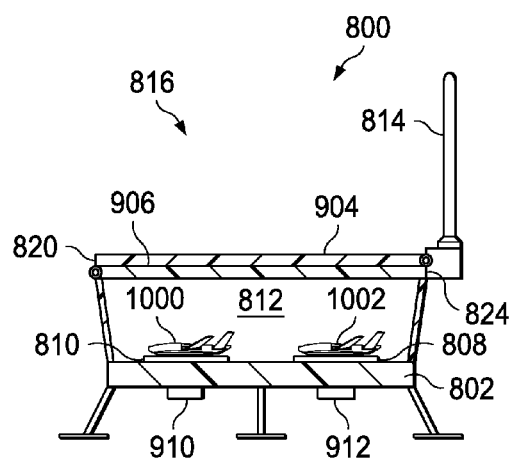
FIG. 10 is an illustration of an unmanned aerial vehicle base station in accordance with an advantageous embodiment.

With reference now to FIG. 10, an illustration of an unmanned aerial vehicle base station is depicted in accordance with an advantageous embodiment.

In this illustrative example, unmanned aerial vehicle base station 800 is shown in a cross-sectional side view with movable cover system 816 in a closed configuration. As can be seen in this example, unmanned aerial vehicles 1000 and 1002 are located within bay 812. These unmanned aerial vehicles are protected from the environment with movable cover system 816 in the closed position.

Figure 11:
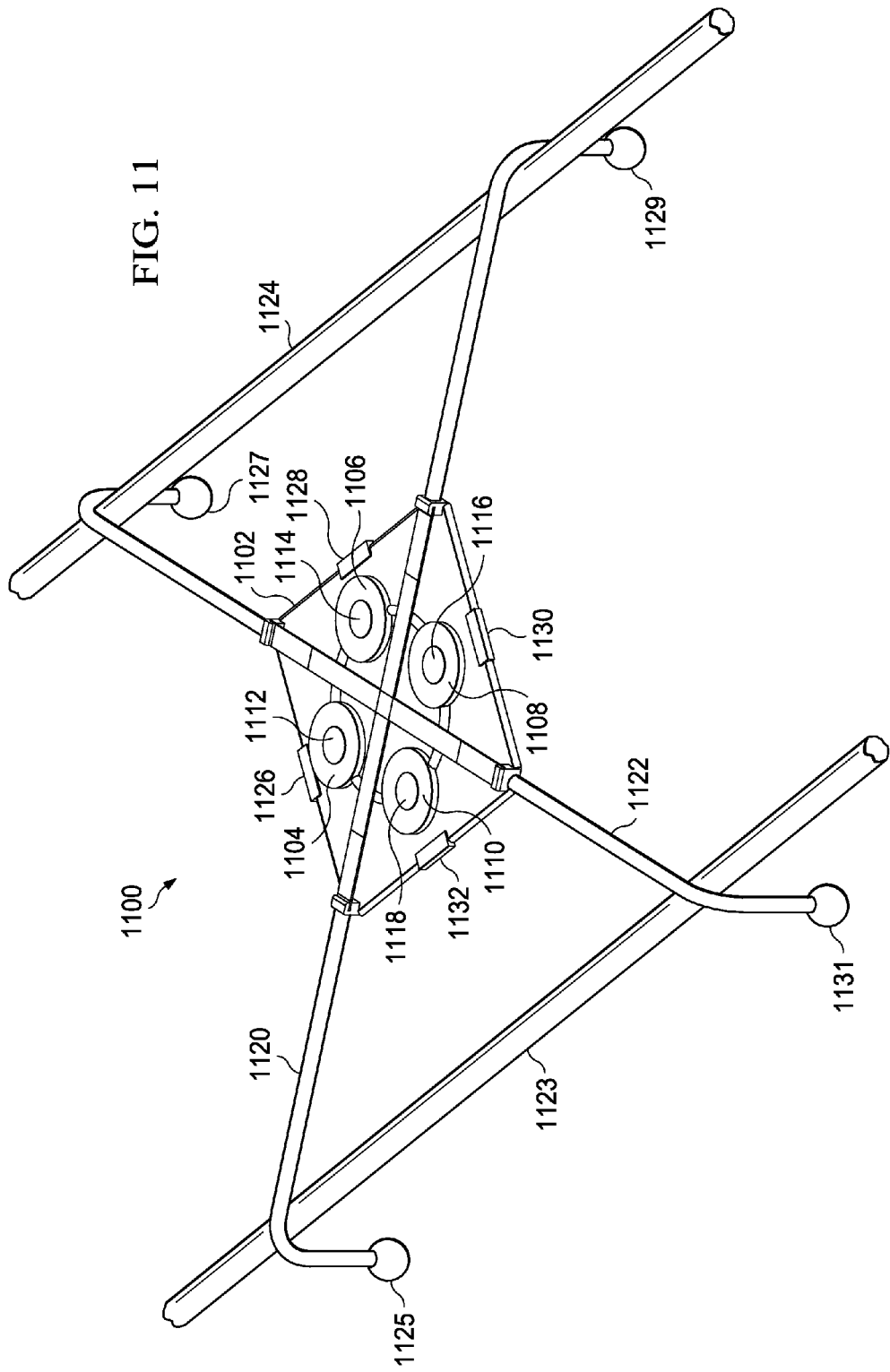
FIG. 11 is an illustration of an unmanned aerial vehicle base station in accordance with an advantageous embodiment.

With reference now to FIG. 11, an illustration of an unmanned aerial vehicle base station is depicted in accordance with an advantageous embodiment. In this illustrative example, unmanned aerial vehicle base station 1100 is an example of another implementation for unmanned aerial vehicle base station 200 in FIG. 2.

In this illustrative example, unmanned aerial vehicle base station 1100 comprises platform 1102. Platform 1102 has unmanned aerial vehicle platforms 1104, 1106, 1108, and 1110. These unmanned aerial vehicle platforms are configured to allow unmanned aerial vehicles to land and recharge. In this example, charging stations 1112, 1114, 1116, and 1118 are present on unmanned aerial vehicle platforms 1104, 1106, 1108, and 1110, respectively.

In this illustrative example, platform 1102 has support members 1120 and 1122. Support member 1120 and support member 1122 are configured to support platform 1102 on power line 1123 and power line 1124. These members may take the form of legs that bend in one direction but not the reverse direction. In this manner, the legs bend over power line 1123 and power line 1124 in one direction to provide stability for platform 1102 on one side of platform 1102. However, by not bending in the reverse direction, the legs provide rigidity to platform 1102 on the other side. These members also may include weights 1125, 1127, 1129, and 1131 to reduce tipping of platform 1102. Support member 1120 and support member 1122 also may be adjustable in length. In this manner, platform 1102 may be placed between power lines with different spacing between the power lines.

Further, in these illustrative examples, coils 1126, 1128, 1130, and 1132 are present. These coils are configured to generate a magnetic field and current in response to alternating current flowing through power lines 1123 and 1124. These coils are part of a power generation system for unmanned aerial vehicle base station 1100. More specifically, these coils may be part of an inductive power generation unit, such as inductive power generation unit 406 in FIG. 4.

Figure 12:
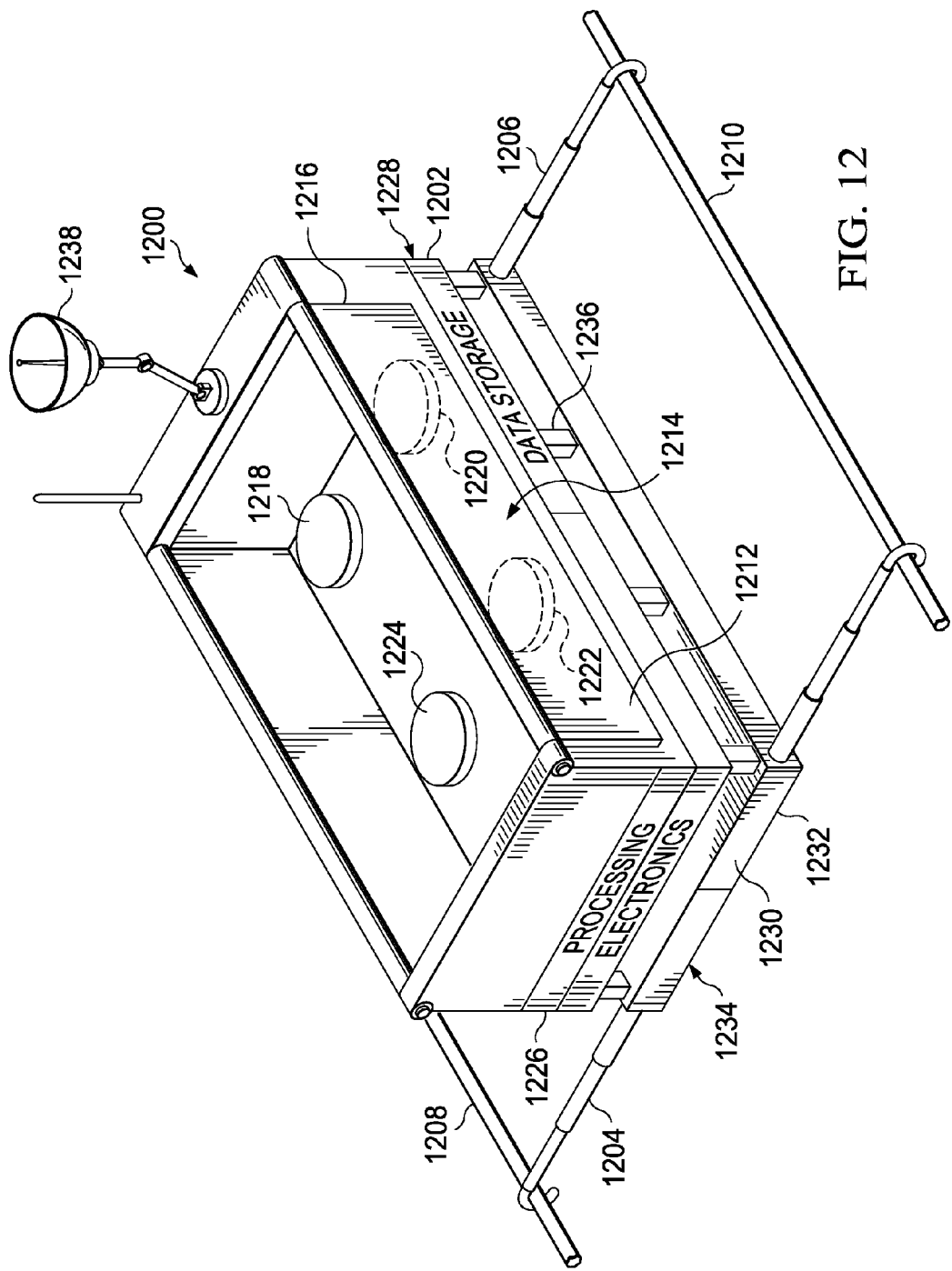
FIG. 12 is an illustration of a perspective view of an unmanned aerial vehicle base station in accordance with an advantageous embodiment.

Turning now to FIG. 12, an illustration of a perspective view of an unmanned aerial vehicle base station is depicted in accordance with an advantageous embodiment. In this illustrative example, unmanned aerial vehicle base station 1200 is an example of yet another implementation for unmanned aerial vehicle base station 200 in FIG. 2.

In this illustrative example, unmanned aerial vehicle base station 1200 is depicted in a partially-exposed view. Unmanned aerial vehicle base station 1200 comprises platform 1202. Platform 1202 may have members 1204 and 1206. These members provide support for unmanned aerial vehicle base station 1200 on power lines 1208 and 1210.

In this exposed view, bay 1212 can be seen inside platform 1202. Bay 1212 has opening 1214, which may be covered by door 1216. Door 1216 may open and close to protect unmanned aerial vehicles from the environment. In these illustrative examples, door 1216 may be opened and closed using an actuator system, a gear system, and/or some other suitable device capable of moving door 1216.

Additionally, in this exposed view, charging stations 1218, 1220, 1222, and 1224 may be seen inside bay 1212. In this illustrative example, controller 1226 may be located in section 1228 of platform 1202. Additionally, battery 1230 and inductive power generation unit 1232 may be located in section 1234 of platform 1202. Section 1234 may be isolated from section 1228 using insulators 1236. Electrical connections between battery 1230 and charging stations 1218, 1220, 1222, and 1224 and controller 1226 may be made through wires extending through insulators 1236.

Satellite communications array 1238 is an example of an antenna that is part of controller 1226 and used to establish wireless communications links.

Figure 13:
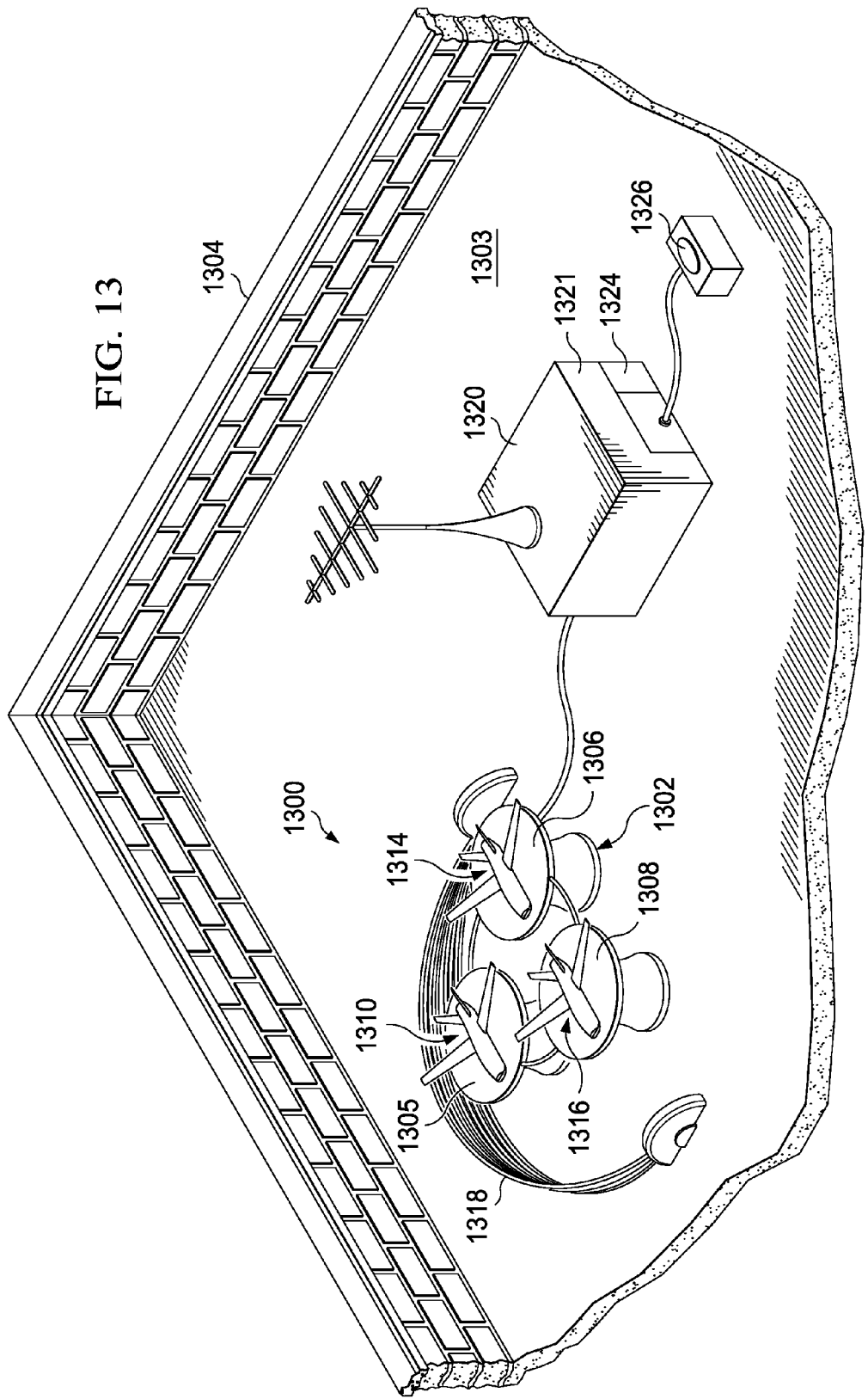
FIG. 13 is another illustration of an unmanned aerial vehicle base station in accordance with an advantageous embodiment.

With reference now to FIG. 13, another illustration of an unmanned aerial vehicle base station is depicted in accordance with an advantageous embodiment. In this illustrative example, unmanned aerial vehicle base station 1300 is an example of another implementation for unmanned aerial vehicle base station 200 in FIG. 2.

In this illustrative example, unmanned aerial vehicle base station 1300 is deployed on rooftop 1303 of building 1304. Unmanned aerial vehicle base station 1300 has platform 1302 with unmanned aerial vehicle platforms 1305, 1306, and 1308. Charging stations 1310, 1314 and 1316 are located on unmanned aerial vehicle platforms 1305, 1306, and 1308, respectively.

Additionally, unmanned aerial vehicle base station 1300 has movable cover 1318. In this illustrative example, unmanned aerial vehicle base station 1300 also has controller 1320. Controller 1320 is in housing 1321, which is a separate structure from platform 1302.

In this illustrative example, unmanned aerial vehicle base station 1300 may not require a battery system or power generation system. Instead, unmanned aerial vehicle base station 1300 has transformer 1324 located inside of controller 1320. Transformer 1324 may be connected to electrical connection 1326 on rooftop 1303 of building 1304. Electrical connection 1326 is used by transformer 1324 to provide power to unmanned aerial vehicle base station 1300.

Figure 14:
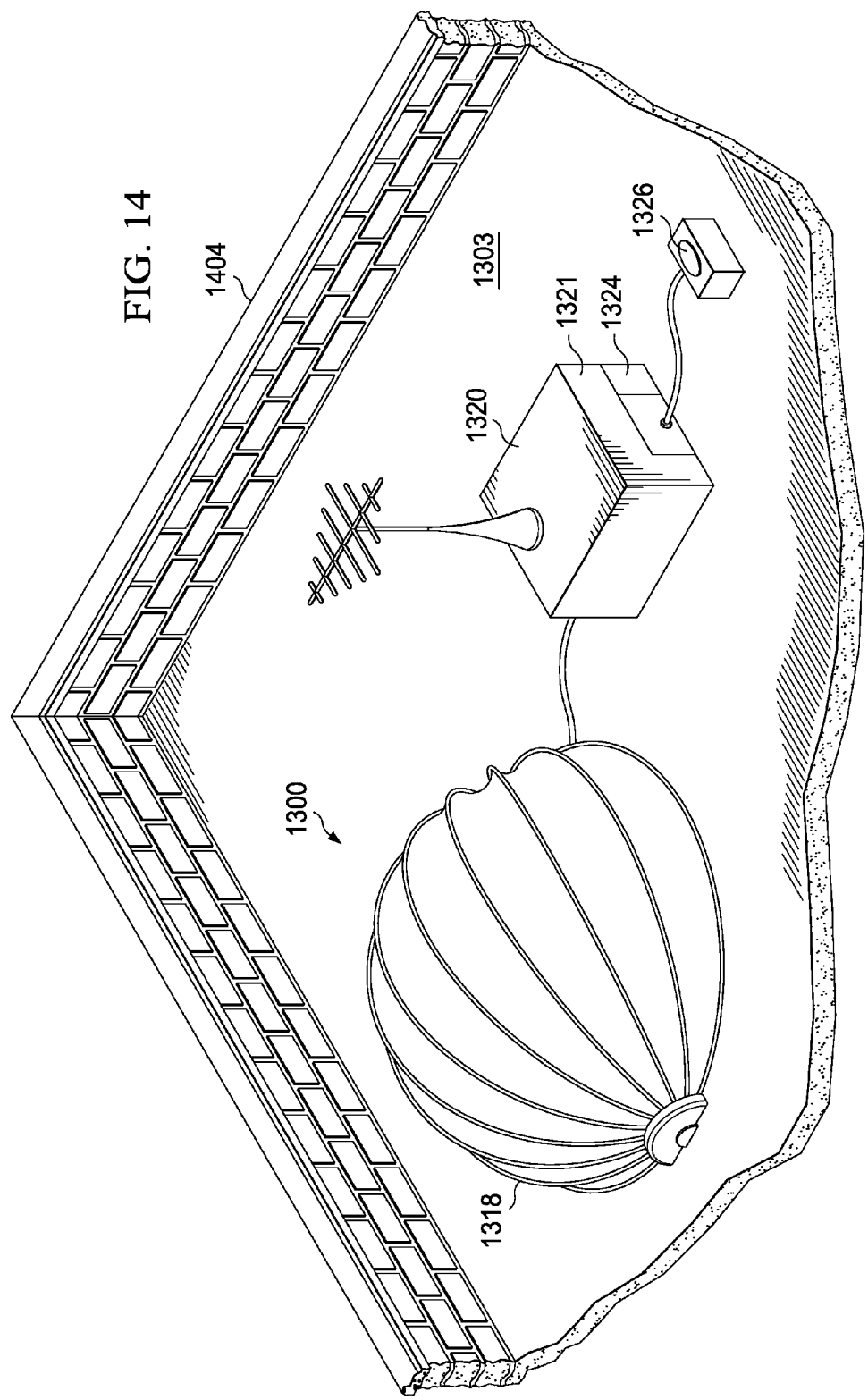
FIG. 14 is an illustration of an unmanned aerial vehicle base station in accordance with an advantageous embodiment.

Turning now to FIG. 14, an illustration of an unmanned aerial vehicle base station is depicted in accordance with an advantageous embodiment. In this illustrative example, movable cover 1318 for unmanned aerial vehicle base station 1300 is in a closed position, providing shelter to any unmanned aerial vehicles that may be on platforms 1305, 1306, and/or 1308 (not shown).

Figure 15:
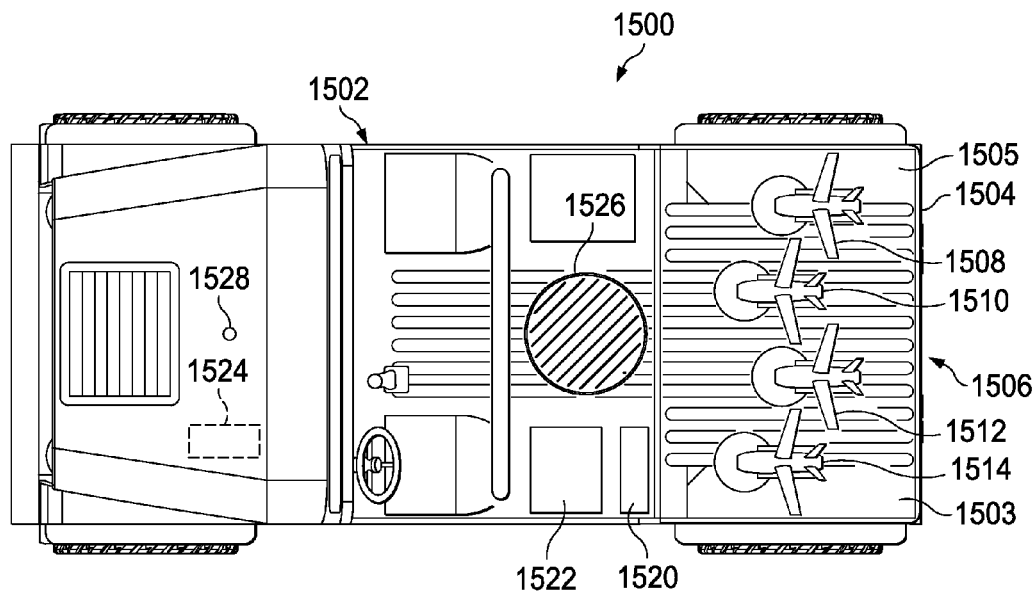
FIG. 15 is an illustration of an unmanned aerial vehicle base station in accordance with an advantageous embodiment.

With reference now to FIG. 15, an illustration of an unmanned aerial vehicle base station is depicted in accordance with an advantageous embodiment. In this example, a top-exposed view of unmanned aerial vehicle base station 1500 is depicted. Unmanned aerial vehicle base station 1500 is an example of yet another implementation for unmanned aerial vehicle base station 200 in FIG. 2. Unmanned aerial vehicle base station 1500 is shown as being integrated into vehicle 1502.

In this illustrative example, platform 1503 has charging station 1504 located within bay 1505. As depicted, charging station 1504 comprises conductive lines 1506.

Unmanned aerial vehicles 1508, 1510, 1512, and 1514 in bay 1505 are located on charging station 1504. Conductive lines 1506 provide for charging through contact between conductive lines 1506 and contacts on unmanned aerial vehicles 1508, 1510, 1512, and 1514.

In this illustrative example, unmanned aerial vehicle base station 1500 also includes controller 1520. Battery system 1522 provides power to charging station 1504. Battery system 1522 is charged by alternator 1524 in vehicle 1502 in these illustrative examples. Antenna 1526 provides for transmission of signals by controller 1520 to exchange information with a remote location. Antenna 1528 provides for communications with unmanned aerial vehicles 1508, 1510, 1512, and 1514.

In other illustrative examples, unmanned aerial vehicle base station 1500 may have side panels associated with bay 1505. These side panels may be used to provide additional landing space for unmanned aerial vehicles 1508, 1510, 1512, and 1514 and/or reduce the number of collisions between these unmanned aerial vehicles.

Figure 16:
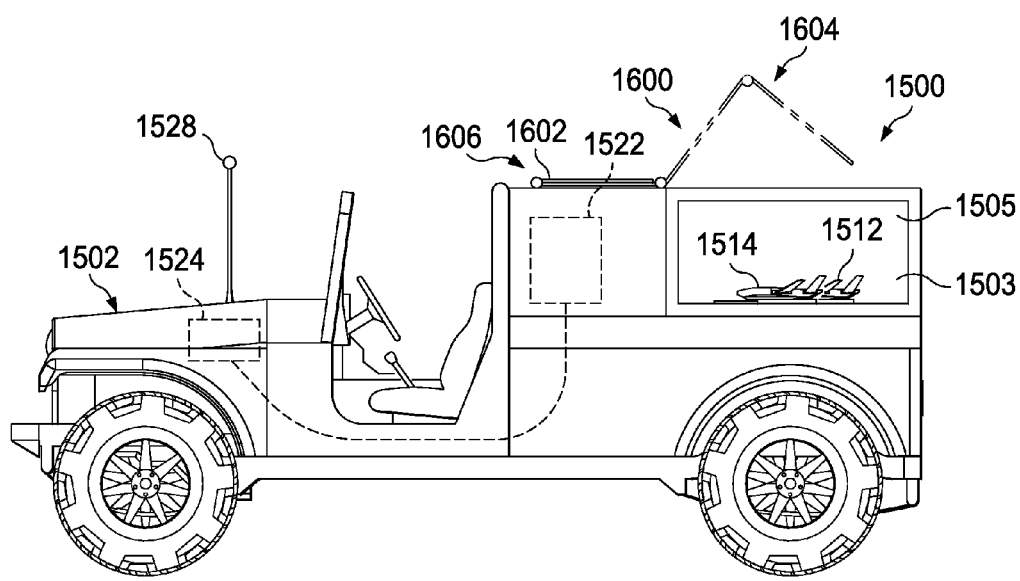
FIG. 16 is an illustration of a side view of an unmanned aerial vehicle base station in accordance with an advantageous embodiment.

Turning now to FIG. 16, an illustration of a side view of an unmanned aerial vehicle base station is depicted in accordance with an advantageous embodiment. In this example, a partially-exposed side view of unmanned aerial vehicle base station 1500 is illustrated. In some advantageous embodiments, unmanned aerial vehicle base station 1500 also may include an energy harvesting system. Unmanned aerial vehicle base station 1500 also may be designed to be removable from vehicle 1502 for deployment in the field.

As depicted in this illustrative example, unmanned aerial vehicle base station 1500 has movable cover system 1600. Movable cover system 1600 takes the form of movable door 1602. Movable door 1602 is seen in partially open position 1604 and fully open position 1606. Movable door 1602 may be closed to cover bay 1505.

Figure 17:
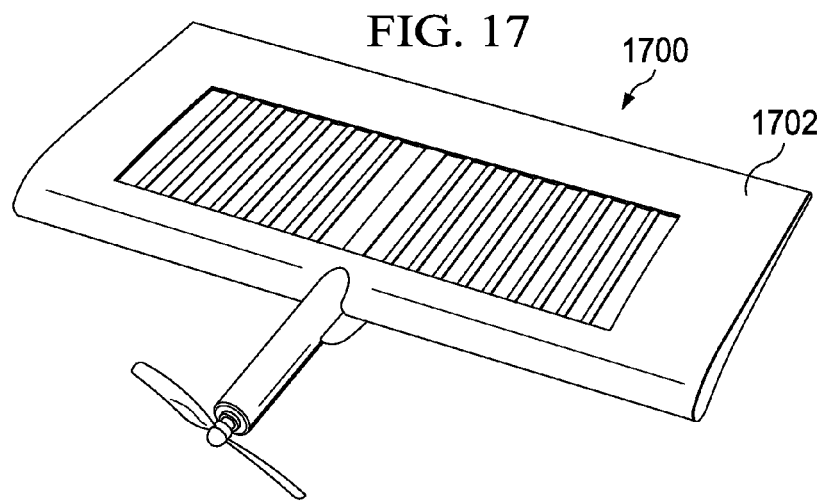
FIG. 17 is an illustration of an unmanned aerial vehicle in accordance with an advantageous embodiment.
Figure 18:
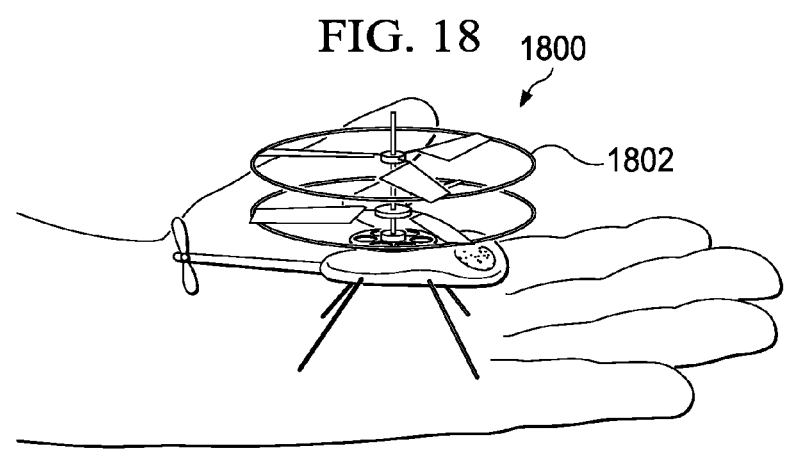
FIG. 18 is an illustration of an unmanned aerial vehicle in accordance with an advantageous embodiment.
Figure 19:
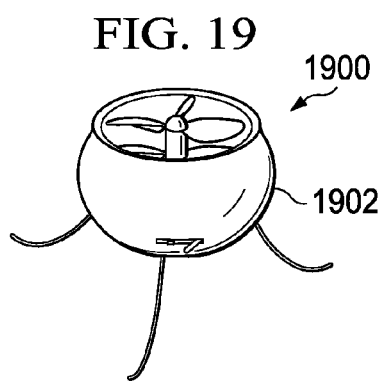
FIG. 19 is an illustration of an unmanned aerial vehicle in accordance with an advantageous embodiment.

Next, FIGS. 17-19 are illustrative examples of implementations for number of unmanned aerial vehicles 214 in FIG. 2. Turning now to FIG. 17, an illustration of an unmanned aerial vehicle is depicted in accordance with an advantageous embodiment. In this illustrative example, unmanned aerial vehicle 1700 is an example of one implementation for one of number of unmanned aerial vehicles 214 in FIG. 2. In this depicted example, unmanned aerial vehicle 1700 takes the form of airplane 1702.

Turning now to FIG. 18, an illustration of an unmanned aerial vehicle is depicted in accordance with an advantageous embodiment. Unmanned aerial vehicle 1800 is an example of another implementation of an unmanned aerial vehicle in number of unmanned aerial vehicles 214 in FIG. 2. In this illustrative example, unmanned aerial vehicle 1800 takes the form of helicopter 1802.

Turning now to FIG. 19, an illustration of an unmanned aerial vehicle is depicted in accordance with an advantageous embodiment. Unmanned aerial vehicle 1900 is an example of yet another implementation of an unmanned aerial vehicle in number of unmanned aerial vehicles 214 in FIG. 2. In this illustrative example, unmanned aerial vehicle 1900 may take the form of direct lift vehicle 1902.

The illustrations of unmanned aerial vehicles in FIGS. 17-19 are not meant to imply physical or architectural limitations to the manner in which different unmanned aerial vehicles may be implemented for use with an unmanned aerial vehicle base station. Other types of unmanned aerial vehicles may be used in addition to or in place of the ones illustrated.

For example, in some advantageous embodiments, an ornithopter may be employed for an unmanned aerial vehicle. In still other advantageous embodiments, the unmanned aerial vehicles may be larger or smaller than the ones illustrated in these examples.

Further, the number of unmanned aerial vehicles may be heterogeneous or homogeneous. In other words, the same type of unmanned aerial vehicles may be present in an unmanned aerial vehicle base station or different types of unmanned aerial vehicles may be used.

In some advantageous embodiments, heterogeneous unmanned aerial vehicles are launched sequentially, as compared to simultaneously. For example, different types of micro air vehicles may be launched sequentially or one at a time. The type of micro air vehicles launched in this example may be based on data to be collected at a ground station in some illustrative examples.

Figure 20:
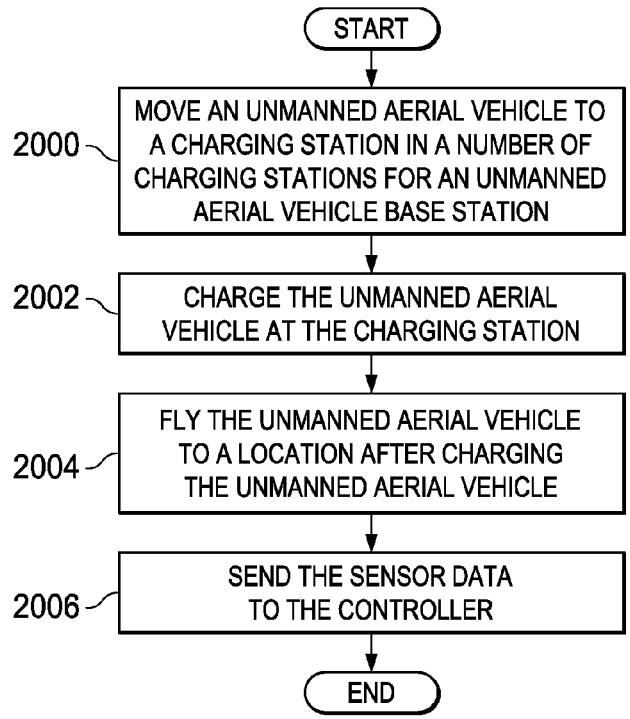
FIG. 20 is an illustration of a flowchart of a process for operating an unmanned aerial vehicle base station in accordance with an advantageous embodiment.

With reference now to FIG. 20, an illustration of a flowchart of a process for operating an unmanned aerial vehicle base station is depicted in accordance with an advantageous embodiment. The process in FIG. 20 may be implemented using unmanned aerial vehicle base station 200 and number of unmanned aerial vehicles 214 in FIG. 2.

The process begins by moving an unmanned aerial vehicle to a charging station in a number of charging stations for an unmanned aerial vehicle base station (operation 2000). In these examples, the unmanned aerial vehicle base station comprises a platform configured to house a number of unmanned aerial vehicles, a battery system configured to store electrical energy, a power generation system connected to the battery system and configured to generate the electrical energy stored in the battery system, the number of charging stations connected to the battery system, and a controller connected to the battery system.

The controller is configured to receive sensor data from the number of unmanned aerial vehicles, generate information from the sensor data, and send the information to a remote location. The power generation system is configured to generate electrical energy from an environment in which the platform is located. Each charging station in the number of charging stations is configured to charge the number of unmanned aerial vehicles.

The unmanned aerial vehicle is charged at the charging station (operation 2002). The unmanned aerial vehicle is flown to a location after charging the unmanned aerial vehicle (operation 2004). The sensor data is sent to the controller (operation 2006), with the process terminating thereafter. In these illustrative examples, the process illustrated in FIG. 20 may be performed each time the unmanned aerial vehicle needs to be recharged.

Figure 21:
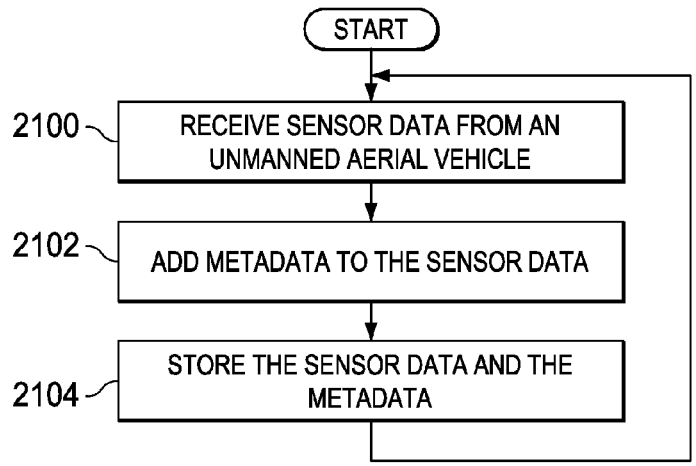
FIG. 21 is an illustration of a flowchart of a process for processing sensor data in accordance with an advantageous embodiment.

With reference now to FIG. 21, an illustration of a flowchart of a process for processing sensor data is depicted in accordance with an advantageous embodiment. The process in FIG. 21 may be implemented using unmanned aerial vehicle base station 200 in FIG. 2.

The process begins by receiving sensor data from an unmanned aerial vehicle (operation 2100). The process adds metadata to the sensor data (operation 2102). This metadata may be, for example, without limitation, an identification of the unmanned aerial vehicle submitting the data, a location of the unmanned aerial vehicle, a time stamp, and/or other suitable information. In some advantageous embodiments, this operation may be optional if the unmanned aerial vehicle provides this information in the sensor data.

The process then stores the sensor data and the metadata (operation 2104), with the process then returning to operation 2100 to receive more sensor data from the unmanned aerial vehicle.

Figure 22:
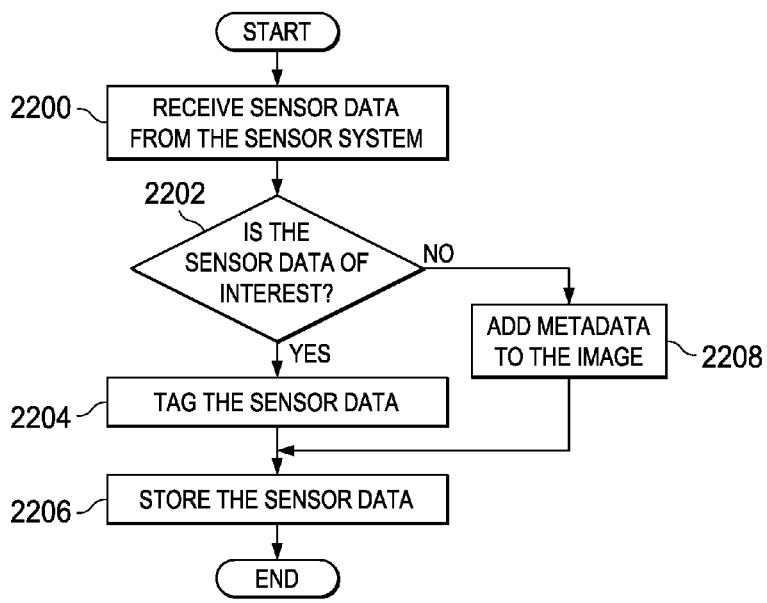
FIG. 22 is an illustration of a flowchart for processing sensor data in accordance with an advantageous embodiment.

With reference now to FIG. 22, an illustration of a flowchart for processing sensor data is depicted in accordance with an advantageous embodiment. The process illustrated in FIG. 22 is an example of a process that may be implemented in an unmanned aerial vehicle, such as unmanned aerial vehicle 700 in FIG. 7. In particular, this process may be implemented in processor unit 716 in FIG. 7. In some advantageous embodiments, this process may be implemented in unmanned aerial vehicle base station 200 using controller 210 in FIG. 2.

The process begins by receiving sensor data from the sensor system (operation 2200). This sensor data may be, for example, an image or video stream. A determination is made as to whether the sensor data is of interest (operation 2202). This determination may be made on the unmanned aerial vehicle and/or at the unmanned aerial vehicle base station. This determination may be made in a number of different ways. For example, the unmanned aerial vehicle may be programmed to look for a particular object, such as a particular vehicle type with a particular color. This information may be part of the mission programmed into the unmanned aerial vehicle.

In other advantageous embodiments, this determination may be made by comparing the image with a prior image from a prior flyover of the location. For example, a change in pixels between the current image and a prior image of the same road may indicate that the sensor data is sensor data of interest.

If the sensor data is sensor data of interest, the sensor data is tagged (operation 2204). In this example, some sort of indicator may be added to the sensor data to identify the image as one of interest. In addition, other information may be added including, for example, an identification of the unmanned aerial vehicle, the location at which the image was taken, and/or the attitude and relative position of the unmanned aerial vehicle relative to the location where the image was taken.

The process then stores the sensor data (operation 2206), with the process terminating thereafter. With reference again to operation 2202, if the sensor data is not sensor data of interest, the process may add metadata to the image (operation 2208). This metadata may include, for example, metadata as described above, with respect to operation 2204. The process then proceeds to operation 2206.

In some advantageous embodiments, the information may also be transmitted to the unmanned aerial vehicle base station from the unmanned aerial vehicle instead of being stored on the unmanned aerial vehicle, depending on the particular implementation. In some advantageous embodiments, if the sensor data is not of interest, the sensor data may be discarded.

Figure 23:
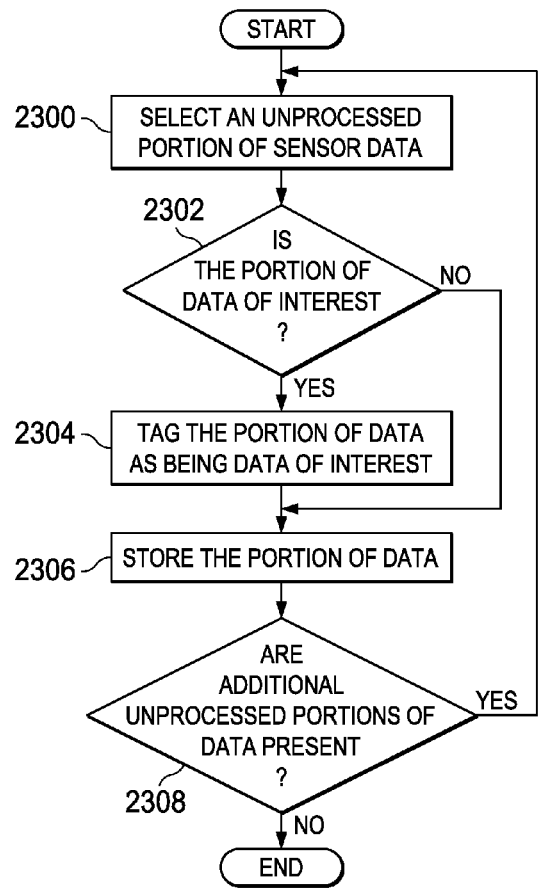
FIG. 23 is an illustration of a flowchart for processing sensor data to form information in accordance with an advantageous embodiment.

With reference now to FIG. 23, an illustration of a flowchart for processing sensor data to form information is depicted in accordance with an advantageous embodiment. The process illustrated in FIG. 23 may be implemented in unmanned aerial vehicle base station 200 in FIG. 2. In particular, the process may be implemented in controller 210 in FIG. 2. This process may be used by controller 210 to process data as the data is received from the unmanned aerial vehicle. In other advantageous embodiments, this processing of data may be performed at a later time.

The process begins by selecting an unprocessed portion of sensor data (operation 2300). The size of the unprocessed portion of sensor data may vary, depending on the particular implementation. For example, the unprocessed portion may be a single image or may be several minutes of video data. The process determines whether the portion of data is of interest (operation 2302). This operation may be performed using various processes or programs. For example, processes looking for changes in images that indicate the presence of improvised explosive devices may be used. The initial data flagged by the unmanned aerial vehicle can be processed to determine whether the change indicates that an improvised explosive device may be present.

Further, processes such as optical moving target indications used to find vehicles also may be used in this operation. Of course, other processes may be used, depending on the particular data that is desired to be identified.

If the portion of data is of interest, the process tags the portion of data as being data of interest (operation 2304). Thereafter, the process stores the portion of data (operation 2306). A determination is made as to whether additional unprocessed portions of data are present (operation 2308). If additional unprocessed portions of data are present, the process returns to operation 2300. Otherwise, the process terminates.

With reference again to operation 2302, if the portion of data is not of interest, the process then proceeds to operation 2306 as discussed above. In some advantageous embodiments, in operation 2306, the process may also transmit the data over a communications link to a remote location in addition to or in place of storing the data.

Figure 24:
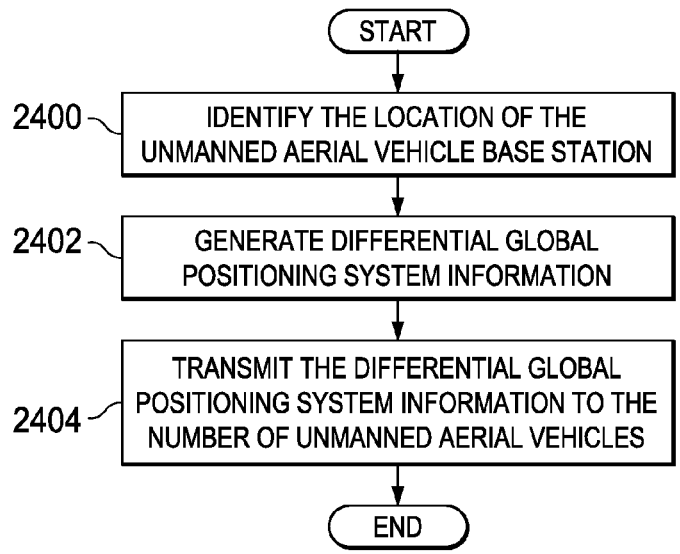
FIG. 24 is an illustration of a flowchart of a process for sending information to an unmanned aerial vehicle in accordance with an advantageous embodiment.

With reference now to FIG. 24, an illustration of a flowchart of a process for sending information to an unmanned aerial vehicle is depicted in accordance with an advantageous embodiment. The process illustrated in FIG. 24 may be implemented in unmanned aerial vehicle base station 200 in FIG. 2. In particular, the process may be implemented in controller 210 in FIG. 2.

The process begins by identifying the location of the unmanned aerial vehicle base station (operation 2400). Thereafter, the process generates differential global positioning system information (operation 2402). Differential global positioning system information is information that may be used by the unmanned aerial vehicle to identify the location of the unmanned aerial vehicle based on the location of the unmanned aerial vehicle base station.

The process then transmits the differential global positioning system information to the number of unmanned aerial vehicles (operation 2404), with the process terminating thereafter.

Figure 25:
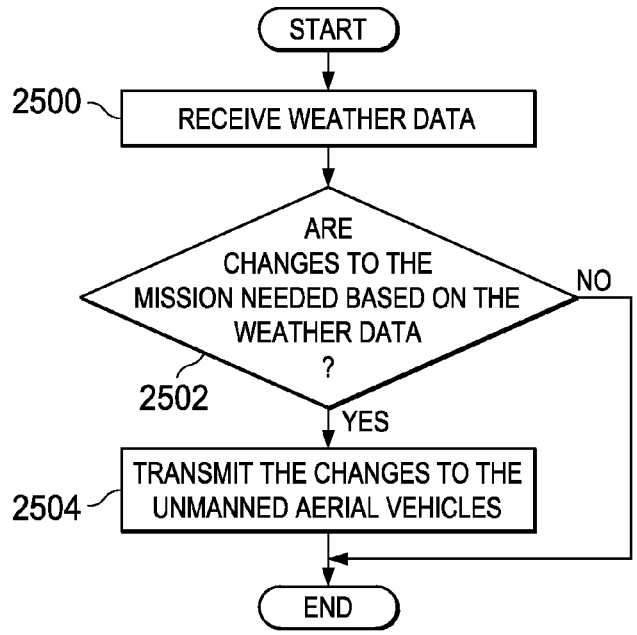
FIG. 25 is an illustration of a flowchart of a process for changing a mission in accordance with an advantageous embodiment.

With reference now to FIG. 25, an illustration of a flowchart of a process for changing a mission is depicted in accordance with an advantageous embodiment. The process illustrated in FIG. 25 may be implemented in unmanned aerial vehicle base station 200 in FIG. 2 and in particular, in controller 210 in FIG. 2.

The process begins by receiving weather data (operation 2500). A determination is made as to whether changes to the mission are needed based on the weather data (operation 2502). This determination may include, for example, without limitation, whether different flight paths should be used to take advantage of tail winds or to avoid undesirable conditions.

Additionally, this determination in operation 2502 also may include changing the mission, such as recalling the number of unmanned aerial vehicles if the analysis determines that the weather conditions may affect the capability of the unmanned aerial vehicles to operate or return to the unmanned aerial vehicle base station.

If changes in the mission are needed, the changes are transmitted to the unmanned aerial vehicles (operation 2504), with the process terminating thereafter. With reference again to operation 2502, if changes are not needed, the process terminates.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for operating unmanned aerial vehicles. In a number of advantageous embodiments, the apparatus comprises a platform, a battery system, a power generation system, a number of charging stations, and a controller. In these different advantageous embodiments, the platform may be configured to house a number of unmanned aerial vehicles. The power generation system is configured to generate electrical energy from an environment in which the platform is located and store electrical energy in the battery system. The number of charging stations is configured to charge the number of unmanned aerial vehicles. The controller is configured to receive sensor data from the number of unmanned aerial vehicles, generate information from the sensor data, and send information to a remote location.

Additionally, with one or more of the different advantageous embodiments, extended operation of unmanned aerial vehicles may be made as compared to currently used processes. The different advantageous embodiments use power generation devices to generate electrical energy that may be used to charge unmanned aerial vehicles in between missions. With the charging stations, the unmanned aerial vehicles may not need intervention by operators to recharge and start another mission. Further, without the need for human operators, the possibility that the unmanned aerial vehicles in the unmanned aerial vehicle base station will be detected will be reduced. These charging stations may reduce the cost associated with using human operators. Further, with multiple unmanned aerial vehicle base stations, unmanned aerial vehicles may be able to operate over larger areas, as compared to currently available systems.

With one or more of the different advantageous embodiments, unmanned aerial vehicles may be operated in areas without requiring human operators for maintenance, launching, or retrieval. In these different advantageous embodiments, the unmanned aerial vehicle base stations may be placed in various locations that may reduce detection of the unmanned aerial vehicle base stations.

Additionally, these unmanned aerial vehicle base stations also may provide an ability to shelter or protect unmanned aerial vehicles from the environment. For example, in one or more of the different advantageous embodiments, unmanned aerial vehicles may be protected from winds, hail, sand storms, and/or other undesirable conditions.

Additionally, an unmanned aerial vehicle base station may be configured such that unmanned aerial vehicles are stored within the platform for transport. This transport may be by, for example, without limitation, a helicopter, a truck, or another suitable transportation system.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a platform configured to house a plurality of unmanned aerial vehicles;
a battery system;
a power generation system connected to the battery system, wherein the power generation system is configured to generate electrical energy from an environment in which the platform is located, and store the electrical energy in the battery system;
a number of charging stations connected to the battery system; and
a controller connected to the battery system and configured to receive sensor data from the plurality of unmanned aerial vehicles, generate information from the sensor data, and send the information to a remote location;
wherein the number of charging stations comprises at least one of a number of inductive coupling systems configured to generate a magnetic field that cause a current to flow in a coil in an unmanned aerial vehicle that charges a battery in the unmanned aerial vehicle and a number of electrical pads configured to make electrical contact with a pad on the unmanned aerial vehicle.

2. The apparatus of claim 1, wherein each charging station in the number of charging stations is configured to charge the plurality of unmanned aerial vehicles.

3. The apparatus of claim 1, wherein the controller is configured to process the sensor data to form the information.

4. The apparatus of claim 1, wherein the sensor data is video data and wherein the controller selects a portion of the video data to form the information.

5. The apparatus of claim 1, wherein the controller stores the sensor data.

6. The apparatus of claim 1, wherein the controller is configured to program each of the plurality of unmanned aerial vehicles with a mission.

7. The apparatus of claim 1, wherein the power generation system comprises at least one of a solar power generation unit, an inductive power generation unit, a wind power generation unit, and a radioisotope thermoelectric generator.

8. The apparatus of claim 1 further comprising:
the plurality of unmanned aerial vehicles.

9. The apparatus of claim 1, wherein the platform has a bay configured to receive the plurality of unmanned aerial vehicles and wherein the number of charging stations is located in the bay.

10. The apparatus of claim 9 further comprising:
a movable cover system configured to move between an open position and a closed position, wherein the movable cover system covers the number of charging stations in the bay in the closed position.

11. The apparatus of claim 1 further comprising:
a sensor system associated with the platform.

12. The apparatus of claim 1, wherein the platform is configured to be associated with a structure selected from one of a set of power lines and a vehicle.

13. The apparatus of claim 1, wherein the platform, the battery system, the power generation system, the number of charging stations, and the controller form an unmanned aerial vehicle base station and further comprising:
a number of additional unmanned aerial vehicle base stations.

14. An apparatus comprising:
a platform configured to house a plurality of unmanned aerial vehicles;
a number of charging stations, wherein each charging station in the number of charging stations is configured to charge the plurality of unmanned aerial vehicles; and
a controller configured to receive sensor data from the plurality of unmanned aerial vehicles;
wherein the number of charging stations comprises at least one of a number of inductive coupling systems configured to generate a magnetic field that cause a current to flow in a coil in an unmanned aerial vehicle that charges a battery in the unmanned aerial vehicle and a number of electrical pads configured to make electrical contact with a pad on the unmanned aerial vehicle.

15. The apparatus of claim 14 further comprising:
a battery system connected to the number of charging stations and the controller; and
a power generation system connected to the battery system, wherein the power generation system is configured to generate electrical energy from an environment in which the platform is located, and store the electrical energy in the battery system.

16. The apparatus of claim 14, wherein the number of charging stations and the controller are connected to an external source power electrical energy.

17. The apparatus of claim 14, wherein the controller is configured to generate information from the sensor data and send the information to a remote location.

18. The apparatus of claim 14 further comprising:
a liquid refueling system connected to the number of charging stations, wherein the liquid refueling system provides liquid fuel to the number of charging stations to charge the plurality of unmanned aerial vehicles.

19. The apparatus of claim 14 further comprising:
an energy storage device connected to the number of charging stations and selected from at least one of a battery system, a capacitor, a flywheel, and a compressed air device.

* * * * *